United States Patent
Sato et al.

(10) Patent No.: US 7,019,917 B2
(45) Date of Patent: Mar. 28, 2006

(54) LENS BARREL

(75) Inventors: Norio Sato, Tokyo (JP); Toshiharu Suzuki, Saitama (JP)

(73) Assignee: PENTAX Corporation, Tokyo (JP)

( * ) Notice: Subject to any disclaimer, the term of this patent is extended or adjusted under 35 U.S.C. 154(b) by 0 days.

(21) Appl. No.: 10/724,714

(22) Filed: Dec. 2, 2003

(65) Prior Publication Data

US 2004/0109240 A1 Jun. 10, 2004

(30) Foreign Application Priority Data

Dec. 3, 2002 (JP) ............................. 2002-351713
Dec. 3, 2002 (JP) ............................. 2002-351714

(51) Int. Cl.
- G02B 15/14 (2006.01)
- G02B 5/22 (2006.01)
- G02B 26/02 (2006.01)
- H04N 5/238 (2006.01)
- G03B 21/14 (2006.01)

(52) U.S. Cl. ................ 359/704; 359/234; 359/694; 359/885; 359/888; 359/30; 348/363; 353/97; 396/63; 396/457

(58) Field of Classification Search ............... 359/704, 359/888, 887, 885, 234, 689, 694, 699, 30; 353/97, 101; 348/363; 219/121.63; 396/262, 396/457, 63
See application file for complete search history.

(56) References Cited

U.S. PATENT DOCUMENTS

| | | | | |
|---|---|---|---|---|
| 3,549,250 A | * | 12/1970 | Pantenburg | 353/97 |
| 3,981,565 A | * | 9/1976 | Karasawa | 359/234 |
| 4,794,418 A | * | 12/1988 | Kabayashi et al. | 396/63 |
| 5,033,832 A | * | 7/1991 | Ito | 359/689 |
| 5,307,184 A | * | 4/1994 | Nishiwaki et al. | 359/30 |
| 5,387,958 A | * | 2/1995 | Pashley | 396/457 |
| 5,555,069 A | * | 9/1996 | Albrecht et al. | 396/262 |
| 5,961,859 A | * | 10/1999 | Chou et al. | 219/121.63 |
| 2002/0021511 A1 | | 2/2002 | Lee et al. | 359/888 |

FOREIGN PATENT DOCUMENTS

| | | |
|---|---|---|
| GB | 1399067 | 6/1975 |
| GB | 2326733 | 12/1998 |
| JP | 5-346605 | 12/1993 |
| JP | 9-15681 | 1/1997 |
| JP | 2000-214514 | 8/2000 |

* cited by examiner

*Primary Examiner*—Loha Ben
(74) *Attorney, Agent, or Firm*—Greenblum & Bernstein, P.L.C.

(57) ABSTRACT

A lens barrel includes an optical system including a short focal length for a wide angle of view; and an ND filter in the shape of a disc which is provided on an optical axis of the optical system. An optical density of the ND filter decreases in a direction radially outwards from a center of the ND filter.

20 Claims, 23 Drawing Sheets

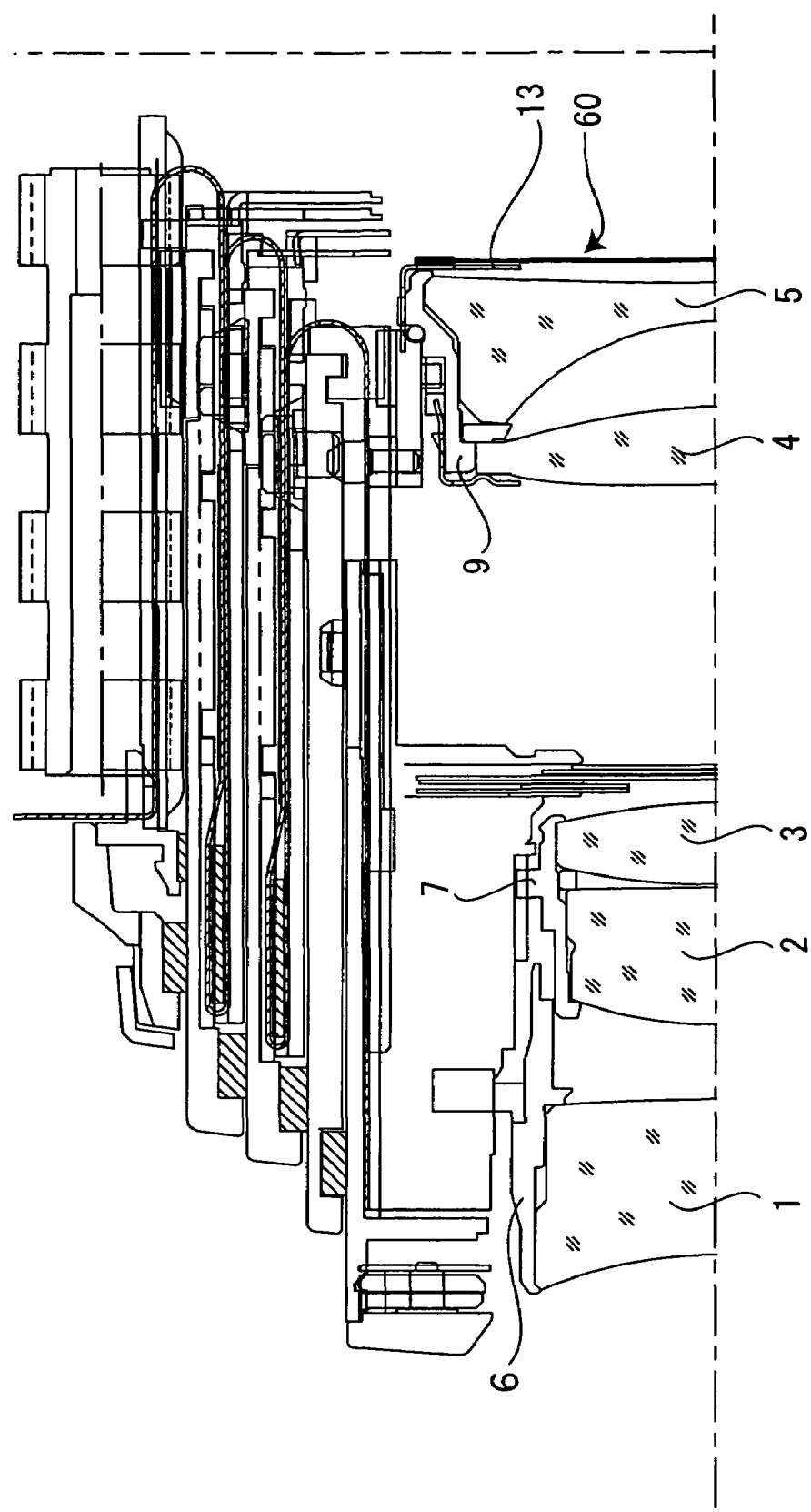

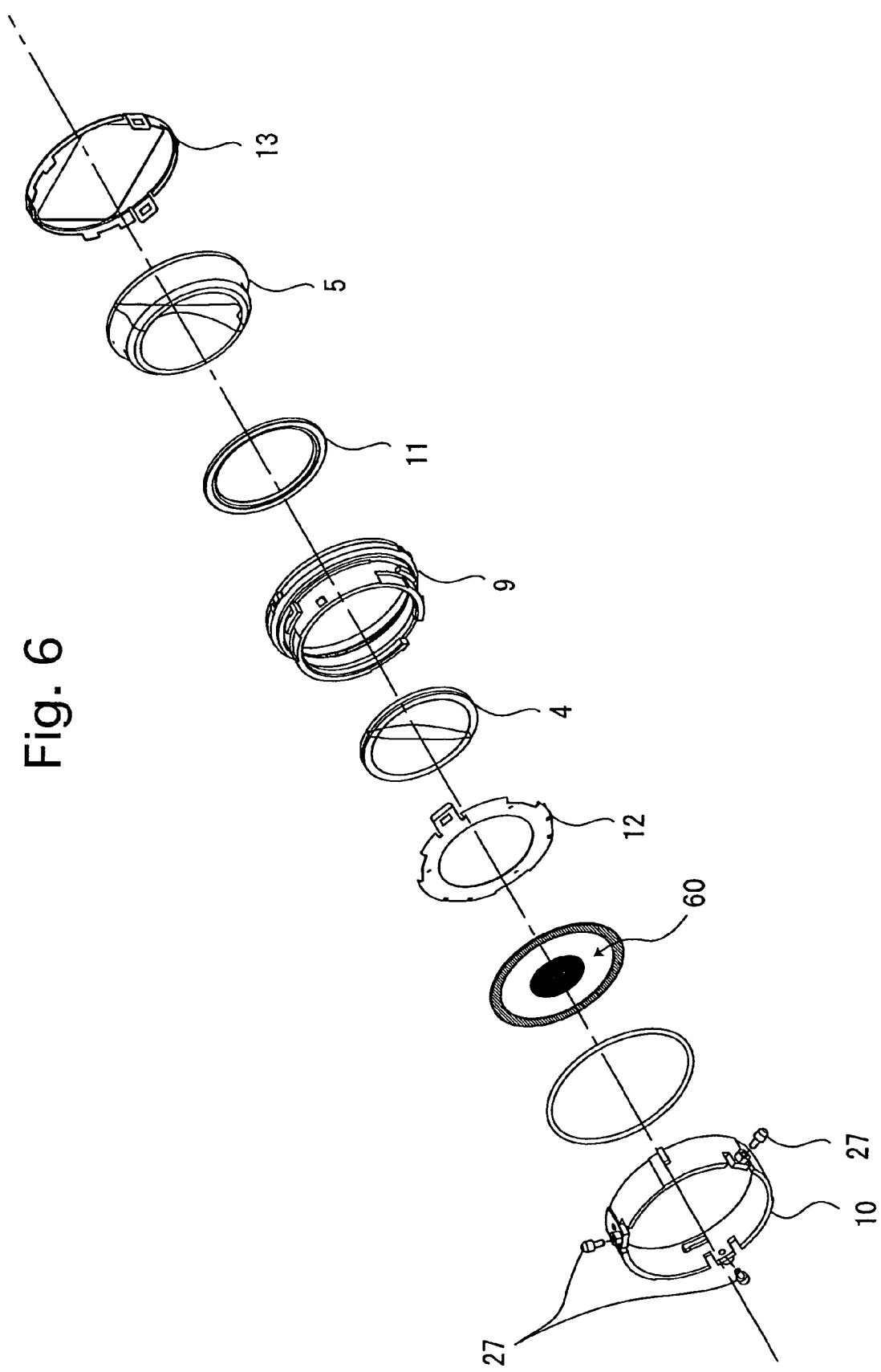

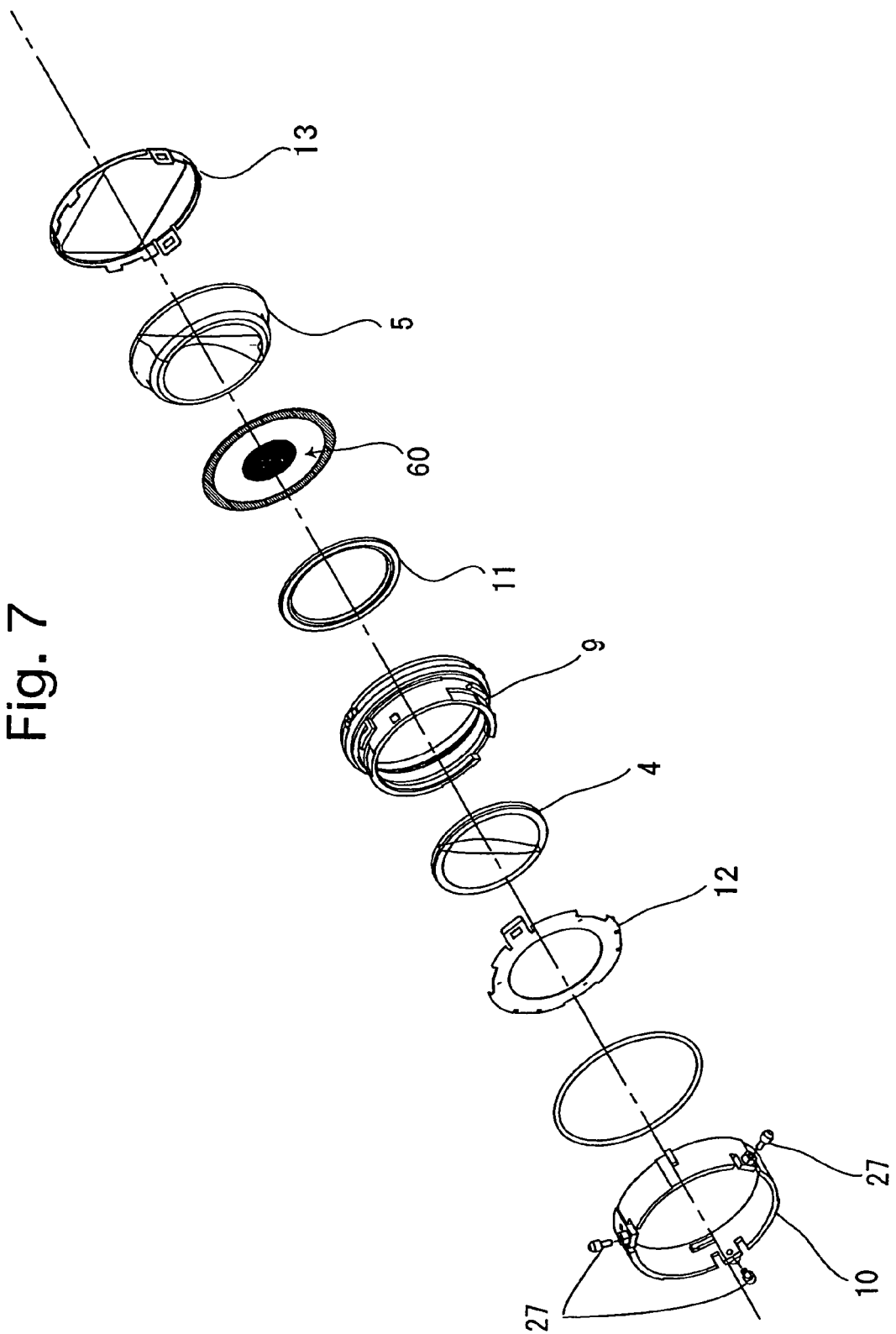

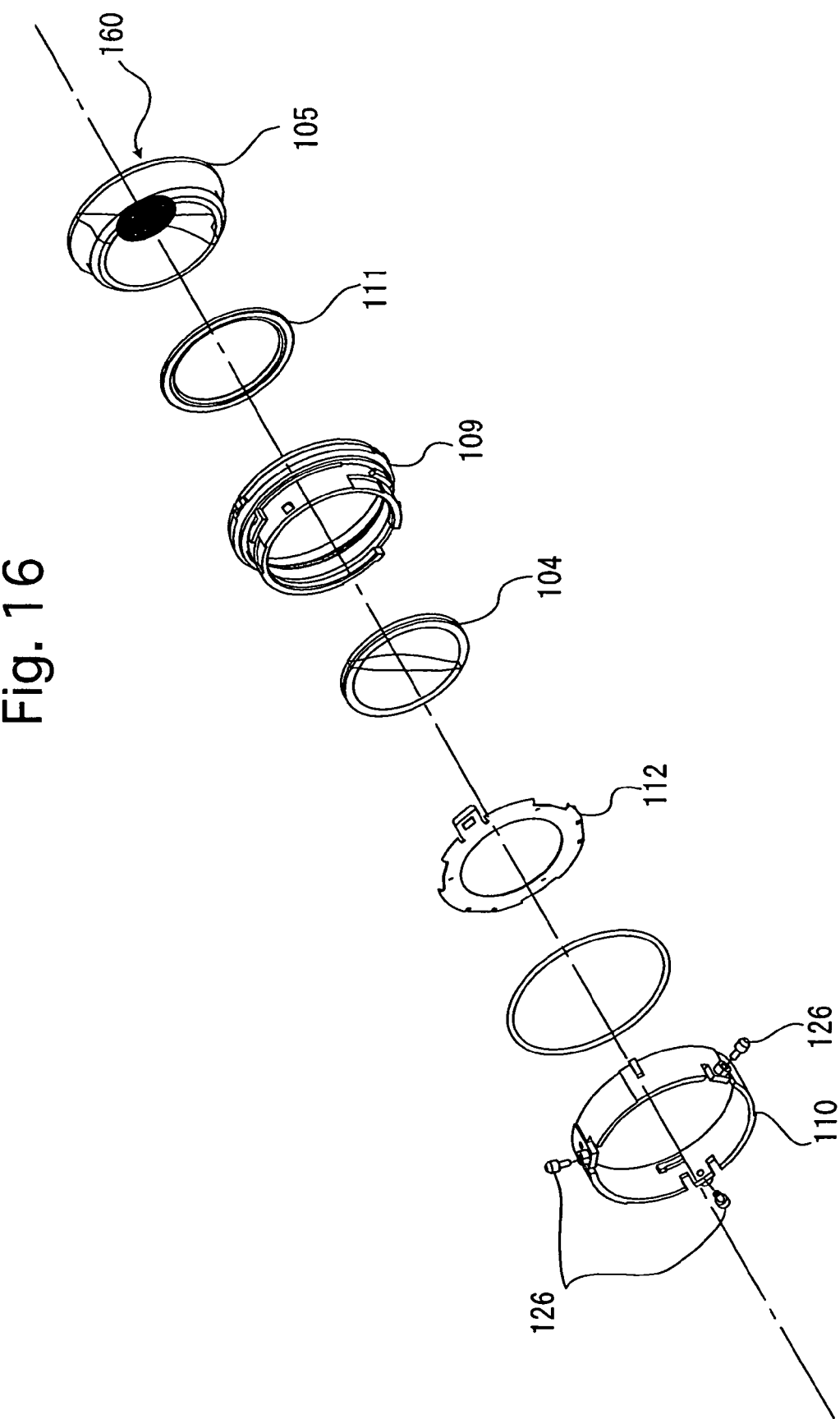

LENS BARREL

BACKGROUND OF THE INVENTION

1. Field of the Invention

The present invention relates to a lens barrel which includes a short focal length for a wide angle of view.

2. Description of the Related Art

Compact zoom cameras having a zoom lens whose focal length at the wide-angle extremity is approximately 28 mm, 35 mm or 38 mm have been popularized in recent years.

Such conventional compact zoom cameras have a problem where the illumination of the marginal area of an image is smaller than that of the center of the image due to the optical properties of the lens. Specifically, in compact cameras the vignetting factor tends to be small (approximately 50 percent, image height≈0.9Y) due to the lens design, thus resulting in a lack of light quantity of marginal rays even if the diaphragm is set to a small aperture.

To combat this problem, a compact zoom camera in which an iris diaphragm is incorporated in a shutter unit has been produced. However, such a shutter unit is complicated in structure and difficult to be controlled, which may cause deterioration in precision of the aperture size to thereby lose half the initial effect of adopting the diaphragm shutter.

To combat this problem, another type of compact zoom camera has been produced having a zoom lens to which modifications are made (e.g., redesigning the zoom lens a large-diameter zoom lens). However, such a modification inevitably increases the size of the compact zoom camera.

SUMMARY OF THE INVENTION

The present invention provides a lens barrel having a simple structure, which minimizes reduction in light quantity of marginal rays.

According to an aspect of the present invention, a lens barrel is provided, including an optical system including a short focal length for a wide angle of view; and an ND filter in the shape of a disc which is provided on an optical axis of the optical system; wherein an optical density of the ND filter decreases in a direction radially outwards from a center of the ND filter.

It is desirable for the ND filter to include a high optical density portion in the shape of a circle which is provided at a center of the ND filter; and a low optical density portion provided around the high optical density portion. A diameter of the high optical density portion is smaller than effective aperture of the optical system.

It is desirable for the ND filter to be fixed to a lens frame which supports at least one lens element of the optical system.

The optical system can include a plurality of lens groups which are fixed to a corresponding plurality of lens frames, the ND filter being fixed to one of the plurality of lens frames.

The lens barrel can further include a shutter unit, wherein the ND filter is fixed to the shutter unit.

It is desirable for the ND filter to include a transparent optical element; and a coating which is applied to a surface of the transparent optical element. A diameter of the coating is smaller than the effective aperture of the optical system.

It is desirable for the ND filter to include at least two portions having different optical densities.

The transparent optical element can be in the shape of a disc.

The lens barrel can be a zoom lens or a telescoping type zoom lens.

It is desirable for the high optical density portion to include at least two portions having different optical densities which are arranged concentrically with respect to the center of the ND filter.

In another embodiment, a lens barrel is provided, including an optical system including a short focal length for a wide angle of view; and an ND coating applied to at least one lens element of the optical system; wherein an optical density of the ND coating decreases in a direction radially outwards from an optical axis of the lens element.

It is desirable for the ND coating to include a high optical density portion in the shape of a circle which is positioned at a center of the ND coating, and a low optical density portion positioned around the high optical density portion. A diameter of the high optical density portion is smaller than effective aperture of the optical system.

The optical system can include a plurality of lens groups. The ND coating is applied to a frontmost lens group of the plurality of lens groups.

The optical system can include a plurality of lens groups. The ND coating is applied to a rearmost lens group of the plurality of lens groups.

It is desirable for the ND coating to be in the shape of a circle having a diameter smaller than the effective aperture of the optical system.

It is desirable for the ND coating to include at least two portions having different optical densities.

The optical system can include a plurality of lens groups, the ND coating being applied to one of the plurality of lens groups.

The lens barrel can be a zoom lens or a telescoping type zoom lens.

It is desirable for the high optical density portion to include at least two portions having different optical densities which are arranged concentrically with respect to the center of the ND coating.

In another embodiment, a photographing lens is provided, including a plurality of lens elements, and at least one ND filter positioned on an optical axis of the plurality of lens elements. An optical density of the ND filter decreases in a direction radially outwards from the optical axis.

The ND filter can be provided as a disc-shaped filter provided separately from the plurality of lens elements.

The ND filter can be provided as a coating applied to at least one of the plurality of lens elements.

The present disclosure relates to subject matter contained in Japanese Patent Applications Nos. 2002-351713 and 2002-351714 (both filed on Dec. 3, 2002) which are expressly incorporated herein by reference in their entireties.

BRIEF DESCRIPTION OF THE DRAWINGS

The present invention will be described below in detail with reference to the accompanying drawings in which:

FIG. 2B is a longitudinal cross sectional view of the lens barrel shown in FIG. 1, showing the lens barrel at wide-angle extremity;

FIG. 6 is an exploded perspective view of the portion of the lens barrel shown in FIG. 5A;

FIG. 7 is an exploded perspective view of the portion of the lens barrel shown in FIG. 5B;

FIG. 16 is an exploded perspective view of a portion of the lens barrel shown in FIG. 13;

DESCRIPTION OF THE PREFERRED EMBODIMENTS

[First Embodiment]

Figure 1:
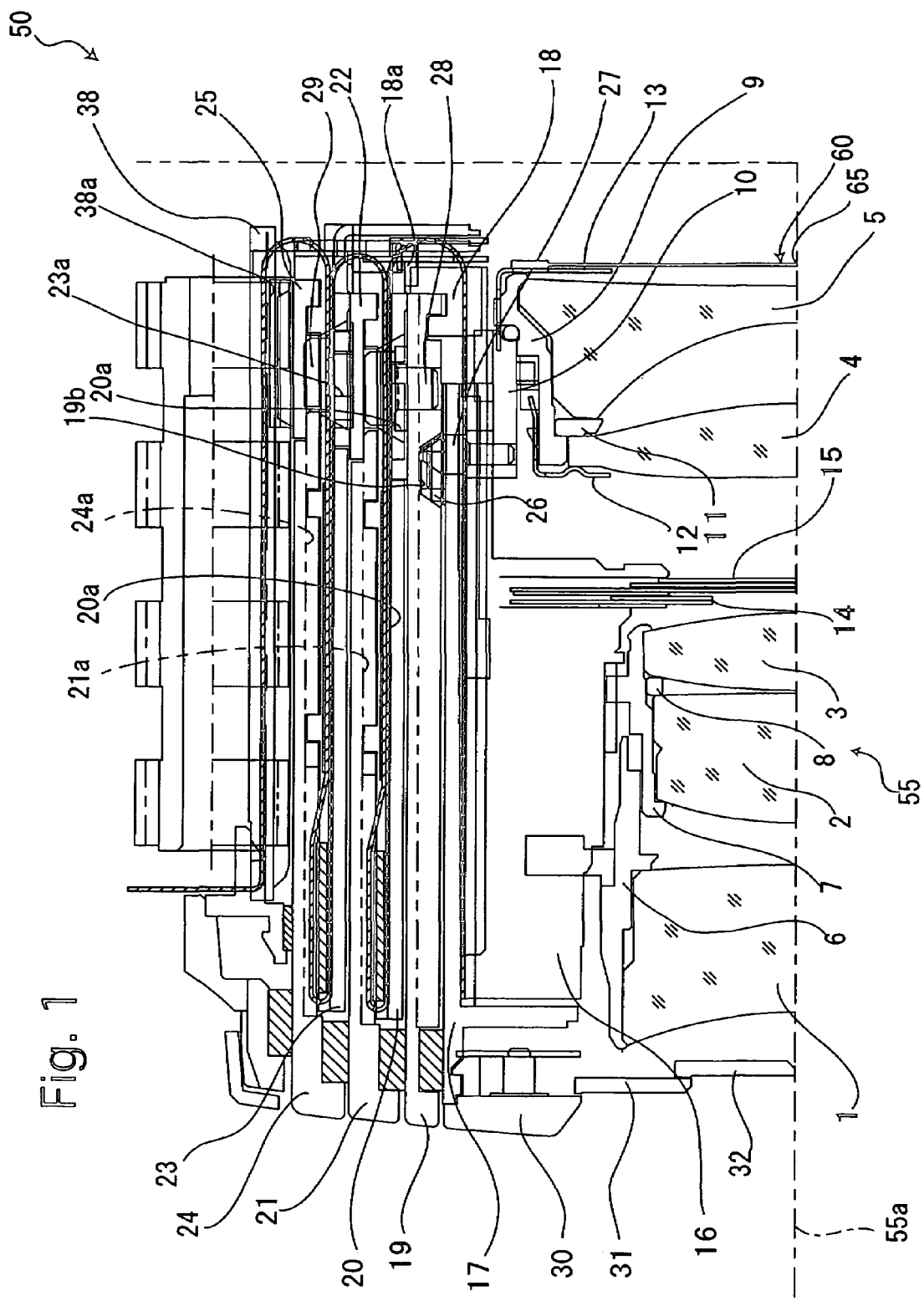
FIG. 1 is a longitudinal cross sectional view of a first embodiment of a lens barrel according to the present invention, showing only an upper half from an optical axis.
Figure 2A:
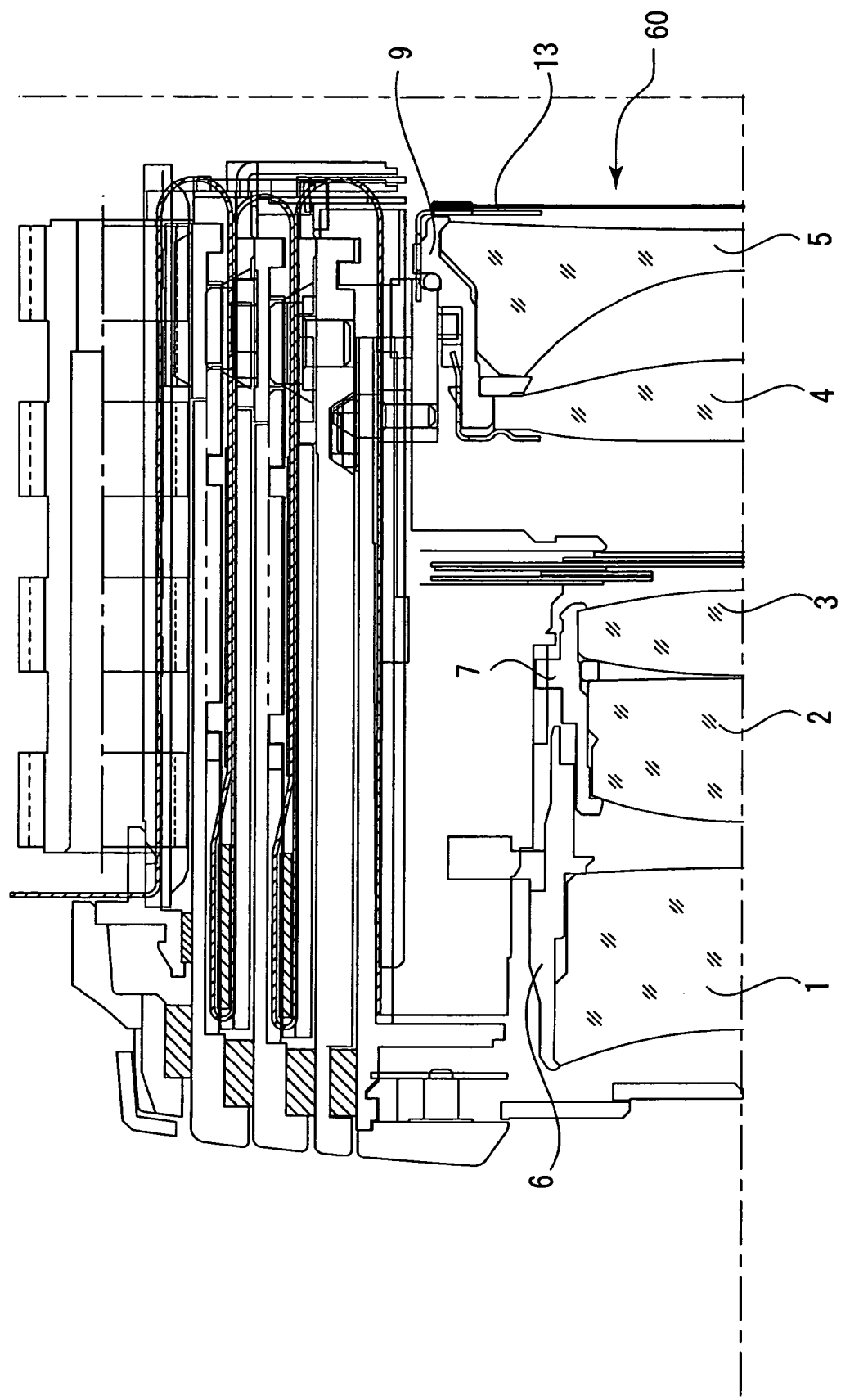
FIG. 2A is a longitudinal cross sectional view of the lens barrel shown in FIG. 1, showing the lens barrel in a retracted state.
Figure 2C:
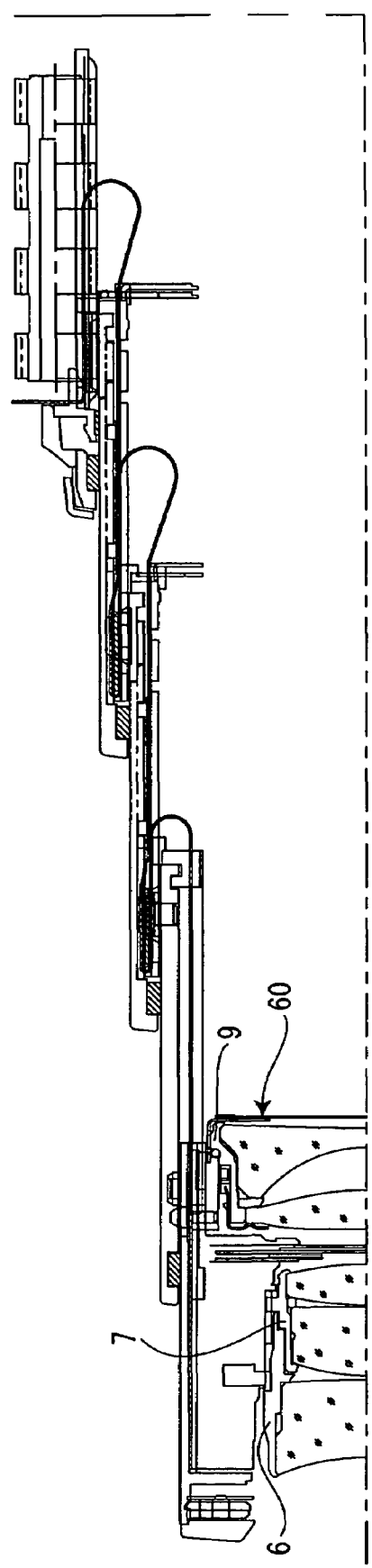
FIG. 2C is a longitudinal cross sectional view of the lens barrel shown in FIG. 1, showing the lens barrel at telephoto extremity.

FIGS. 1 through 2C show a first embodiment of a lens barrel according to the present invention. As can be appreciated from FIGS. 1 through 2C, the lens barrel 50 is a telescoping type zoom lens of a camera which is provided with four external telescoping barrels: a first external barrel (lens support barrel) 17, a second external barrel (cam ring) 19, a third external barrel 21 and a fourth external barrel 24 which are concentrically arranged about an optical axis 55a of a photographing optical system 55 of the lens barrel 50. The photographing optical system 55 of the lens barrel 50 includes a first lens group (lens element) 1, a second lens group (lens element) 2, a third lens group (lens element) 3, a diaphragm (diaphragm blades) 14, a shutter (shutter blades) 15, a fourth lens group (lens element) 4, and a fifth lens group (lens element) 5, in that order from the object side (the left side as viewed in FIG. 1). The lens barrel 50 is provided around the fourth external barrel 24 with a housing 38 which supports the first through fourth external barrels 17, 19, 21 and 24 so that each of the first through fourth external barrels 17, 19, 21 and 24 can move forward and rearward with respect to each other along the optical axis 55a. In the following descriptions, the front side and the rear side refer to the object side (the left side as viewed in FIG. 1) and the film side (the right side as viewed in FIG. 1), respectively.

The fourth external barrel 24 is coupled to the housing 38 by engagement of a male helicoid with a female helicoid which are formed on the fourth external barrel 24 and the housing 38, respectively. Likewise, the third external barrel 21 is coupled to the fourth external barrel 24 by engagement of a male helicoid with a female helicoid which are formed on the third external barrel 21 and the fourth external barrel 24, respectively. Likewise, the second cam ring 19 is coupled to the third external barrel 21 by engagement of a male helicoid with a female helicoid which are formed on the cam ring 19 and the third external barrel 21, respectively. The first external barrel (lens support barrel) 17 is coupled to the cam ring 19 by a cam mechanism provided therebetween.

The fourth external barrel 24 is fitted into the housing 38, and a second helicoid ring 25 is fixed to a rear end surface of the fourth external barrel 24. The second helicoid ring 25 is engaged with an axial groove 38a parallel to the optical axis 55a formed on an inner peripheral surface of the housing 38. Due to this engagement of the second helicoid ring 25 with the axial groove 38a, the fourth external barrel 24, together with the second helicoid ring 25, can move along the optical axis 55a with respect to the housing 38.

The lens barrel 50 is provided inside the fourth external barrel 24 with a third linear guide ring 23 which is fitted into the fourth external barrel 24. The third linear guide ring 23 is provided on an inner peripheral surface thereof with a plurality of inclined lead slots 23a which are inclined with respect to the optical axis direction (i.e., the direction parallel to the optical axis 55a). The third external barrel 21 is fitted into the third linear guide ring 23, and a first helicoid ring 22 is fixed to a rear end of the third external barrel 21. The fourth external barrel 24 is provided on an inner peripheral surface thereof with a plurality of linear guide grooves 24a (only one of them appears in FIG. 1) which extend parallel to the optical axis 55a. A plurality of guide followers 29 (only one of them appears in FIG. 1) which are fixed to an outer peripheral surface of the first helicoid ring 22 pass through the plurality of inclined lead slots 23a to be engaged in the plurality of linear guide grooves 24a, respectively. With this engagement of the guide followers 29 with both the inclined lead slots 23a and the linear guide grooves 24a, the third external barrel 21 and the first helicoid ring 22 are linearly guided by the third linear guide ring 23 in the optical axis direction.

The lens barrel 50 is provided radially inside the third external barrel 21 with a second linear guide ring 20 which is fitted into the third external barrel 21. The second linear guide ring 20 is provided with two inclined lead slots 20a which pass through the second linear guide ring 20 and are inclined with respect to the optical axis direction (i.e., the direction parallel to the optical axis 55a). The third external barrel 21 is provided on an inner peripheral surface thereof with two rotation transmitting grooves 21a (only one of them appears in FIG. 1) which extend parallel to the optical axis 55a. Two guide followers 28 (only one of them appears in FIG. 1) which are fixed to an outer peripheral surface of the cam ring 19 at equi-angular intervals (i.e., at intervals of 180 degrees) in a circumferential direction of the cam ring 19 pass through the two inclined lead slots 20a to be engaged in the two rotation transmitting grooves 21a, respectively. Due to the engagement of the guide followers 28 with both the inclined lead slots 20a and the rotation transmitting grooves 21a, the cam ring 19 is linearly guided by the second linear guide ring 20 in the optical axis direction.

The lens barrel 50 is provided inside the cam ring 19 with a first linear guide ring 18. The first linear guide ring 18 is supported by the cam ring 19 to move together with the cam ring 19 while allowing the cam ring 19 to rotate with respect to the first linear guide ring 18. The first linear guide ring 18 is provided at a rear end thereof with a plurality of linear guide projections 18a which project radially outwards to be engaged in a plurality of linear guide grooves 20b formed on an inner peripheral surface of the second linear guide ring 20. This engagement of the linear guide projections 18a with the linear guide grooves 20b allows the first linear guide ring 18 to move linearly in the optical axis direction without rotating with respect to the second linear guide ring 20.

The lens barrel 50 is provided inside the cam ring 19 with a lens support ring 17, and is provided inside the lens support ring 17 with a rear lens frame 9. The lens support ring 17 and the rear lens frame 9 are linearly guided in the optical axis direction by the first linear guide ring 18. A rotation of the cam ring 19 relative to the lens support ring 17 causes the lens support ring 17 to move forward from the cam ring 19 in accordance with contours of a set of three cam grooves 19b formed on an inner peripheral surface of the cam ring 19. The set of three cam grooves 19b are formed on an inner peripheral surface of the cam ring 19 in the vicinity of the rear end thereof at equi-angular intervals in a circumferential direction of the cam ring 19. A set of three cam followers pins 27 radially extend through the lens support ring 17 at equi-angular intervals in a circumferential direction of the lens support ring 17, and are fixed to the lens support ring 17 so that radially outer ends of the set of three cam followers pins 27 are engaged in the set of three cam grooves 19b. A set of three cam follower rollers 26 are fixed to an outer peripheral surface of the lens support ring 17 to project radially outwards to be engaged in the set of three cam grooves 19b so that a rotation of the cam ring 19 with respect to the lens support ring 17 causes the lens support ring 17 to move along the optical axis 55a in a predetermined moving manner due to the engagement of the three cam follower rollers 26 with the three cam grooves 19b.

The lens barrel 50 is provided inside the lens support ring 17 with a shutter unit (AF/AE shutter unit) 16 having the diaphragm 14 and the shutter 15. The lens barrel 50 is provided inside the shutter unit 16 with a front lens frame 6 and a middle lens frame 7 which are supported by the shutter unit 16 to be movable along the optical axis 55a relative to the shutter unit 16. The first lens group 1 is supported by the front lens frame 6 to be fixed thereto. The second lens group 2 and the third lens group 3 are supported by the middle lens frame 7 to be fixed thereto with a spacer ring 8 being provided between the second lens group 2 and the third lens group 3. The front lens frame 6 and the middle lens frame 7 are supported by the shutter unit 16 to be movable relative to each other along the optical axis 55a.

The set of three cam follower pins 27, which radially extend through the lens support ring 17, are fixed at their radially inner ends to an outer peripheral surface of a rear lens frame moving ring 10 which is positioned inside the lens support ring 17 in the vicinity of the rear end thereof. The rear lens frame 9 is screwed into a rear end portion of the rear lens frame moving ring 10. The fourth lens group 4 and the fifth lens group 5 are supported by the rear lens frame 9 to be fixed thereto. Movement of the set of three cam follower pins 27 in the set of three of three cam grooves 19b therealong causes the rear lens frame 9 to move along the optical axis 55a. The fourth lens group 4 is fixed to the rear lens frame 9 by a fourth lens group pressing ring 12 which is fitted on a front end of the rear lens frame 9. The fourth lens group 4 and the fifth lens group 5 are supported by the rear lens frame 9 to be fixed thereto with a spacer ring 11 being interposed between the fourth lens group 4 and the fifth lens group 5.

As shown in FIGS. 2A, 2B and 2C, by moving the front lens frame 6, the middle lens frame 7 and the rear lens frame 9 along the optical axis 55a relative to one another, the lens barrel 50 changes between an accommodated position (shown in FIG. 2A) and an wide-angle extremity (shown in FIG. 2B), and can change the focal length between the wide-angle extremity (shown in FIG. 2B) and the telephoto extremity (shown in FIG. 2C). Although the focal length of the photographing optical system 55 at the wide-angle extremity is set to 20 mm (35 mm film camera conversion) in the present embodiment of the lens barrel, reduction in light quantity of marginal rays can be minimized if the focal length of the photographing optical system 55 at the wide-angle extremity is set to a focal length in a wide-angle range between 20 mm and 38 mm (35 mm film camera conversion). The shutter unit 16 drives the front lens frame 6 and the middle lens frame 7 forward and rearward along the optical axis 55a while changing the space therebetween to perform a focusing operation.

The lens barrel 50 is provided at the front end of the lens support frame 17 with a lens barrier mechanism which automatically closes a front end aperture of the lens barrel 50 when the lens barrel 50 is retracted into the camera body as shown in FIG. 2A, i.e., when the lens barrel 50 is not in use. The lens barrier mechanism is provided with a decorative plate 30 which is fixed to the front end of the lens support frame 17, and is further provided immediately behind the decorative plate 30 with a pair of barrier blades 31 and 32, each of which is pivoted on an associated pivot (not shown) formed on a rear surface of the decorative plate 30. When the power of the camera is turned ON and OFF, the pair of barrier blades 31 and 32 rotate together about the respective pivots to open and close a front end aperture of the lens barrel 50 which is formed on the decorative plate 30.

Figure 3A:
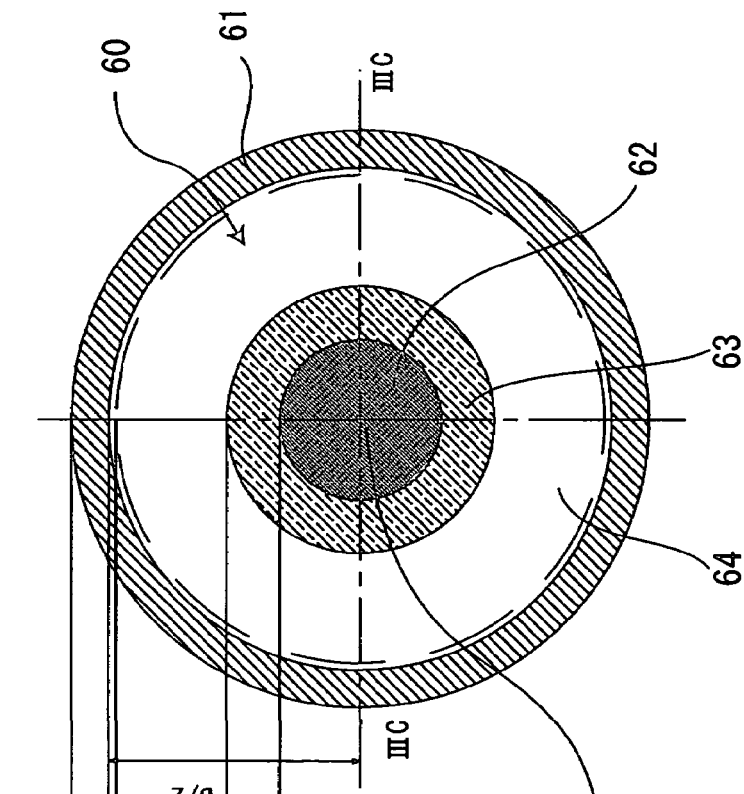
FIG. 3A is a longitudinal cross sectional view of a portion of the lens barrel shown in FIG. 1, showing the location of an ND filter in the lens barrel.
Figure 4:
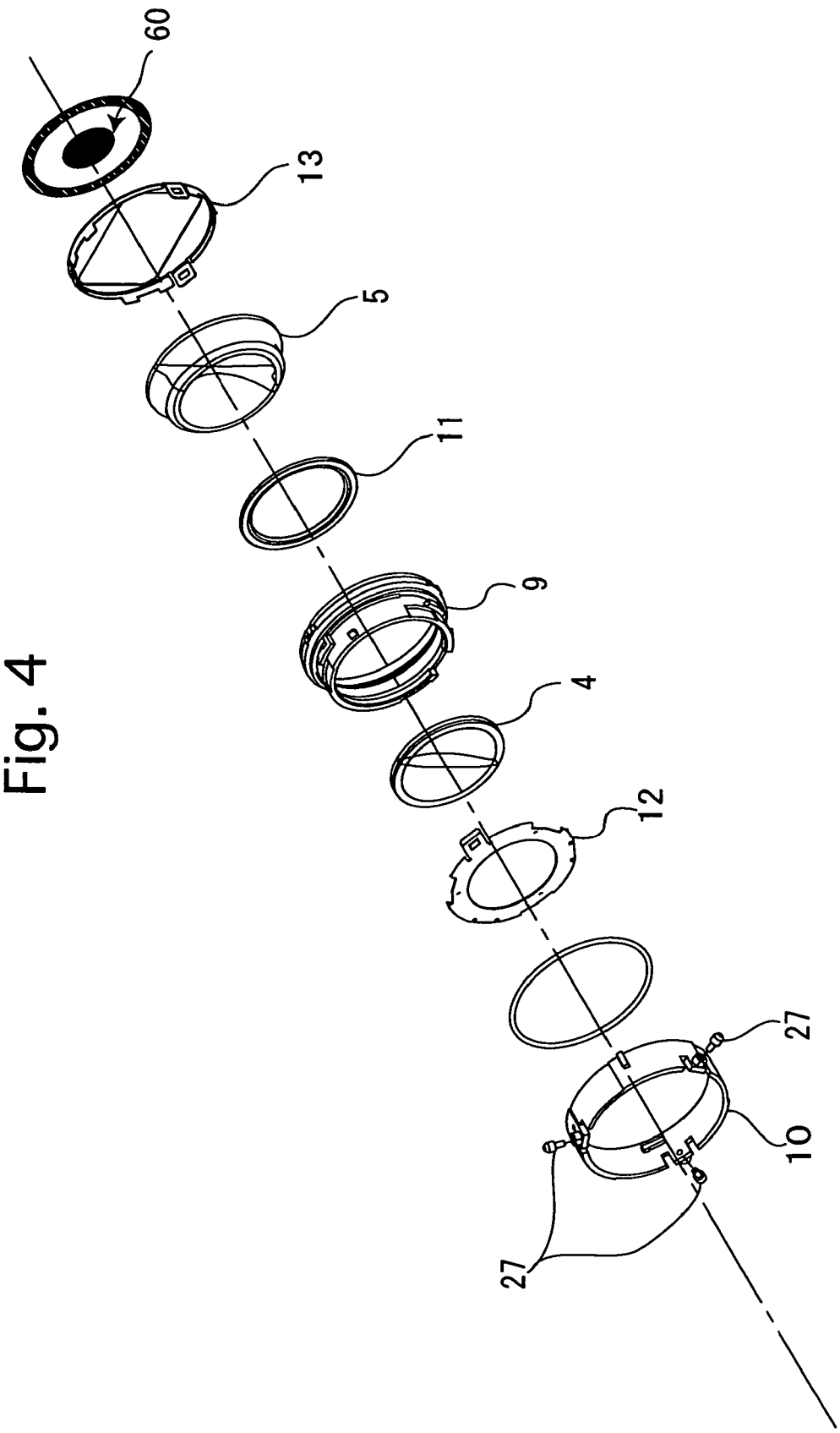
FIG. 4 is an exploded perspective view of a portion of the lens barrel shown in FIG. 1.

The lens barrel 50 is provided at the rear end of the rear lens frame 9 with a light shield frame 13 having a rectangular aperture (see FIGS. 3A and 4) which is fixed to the rear end of the rear lens frame 9. The lens barrel 50 is provided immediately behind the rear lens frame 9 with a circular ND (neutral density) filter 60 in the shape of a disc which is fixed to a rear end surface of the light shield frame 13 so that a center 65 of the ND filter 60 is positioned on the optical axis 55a.

Figure 3B:
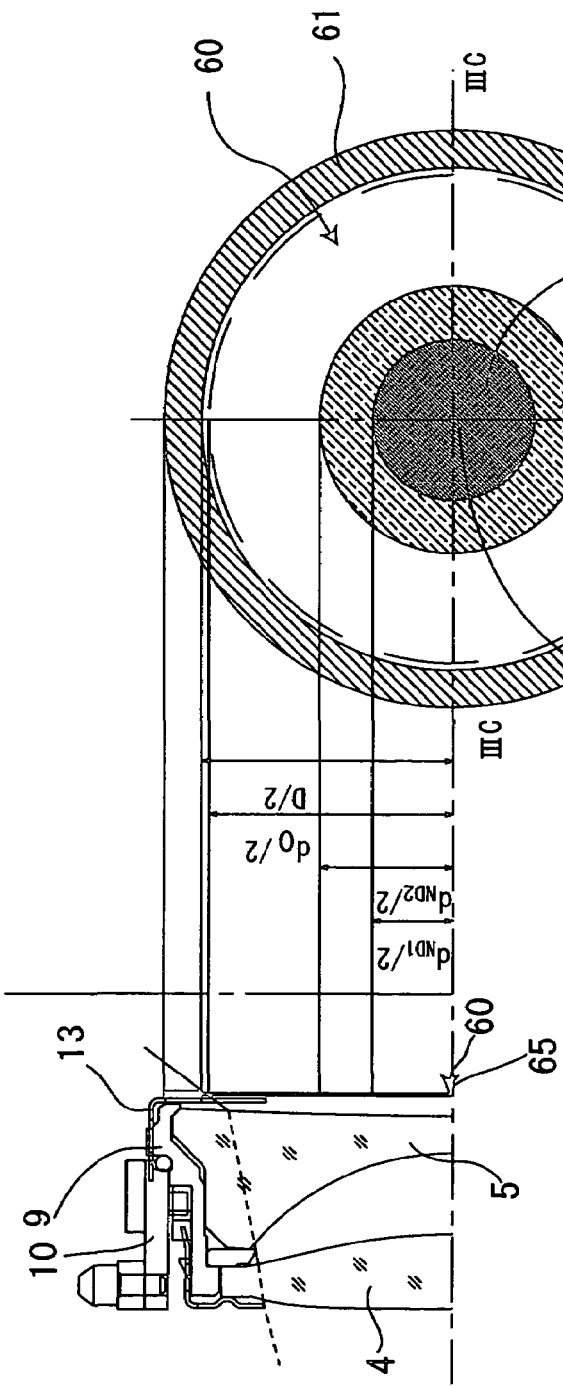
FIG. 3B is a plan view of the ND filter, showing the structure thereof.

As shown in FIG. 3B, the disc-shaped ND filter 60 is provided on the outer edge thereof with an annular filter frame 61 having an outer diameter substantially the same as the outer diameter of the light shield frame 13. The disc-shaped ND filter 60 has three concentric filter portions which are formed concentrically with respect to the center 65. These three concentric filter portions are a first ND portion 62 (diameter=$d_{ND1}$) serving as a central ND portion, a second ND portion 63 (diameter=$d_{ND2}$) positioned around the first ND portion 62, and a third ND portion 64 (diameter=$d_0$) positioned around the second ND portion 63. The optical density (reflectance) of the first ND portion 62 is higher than those of the other two ND portions 63 and 64. The optical density (reflectance) of the second ND portion 63 is slightly lower than that of the first ND portion 62, but is still high so that the first ND portion 62 and the second ND portion 63 constitute a high optical density portion of the ND filter 60. The optical density of the third ND portion 64 is much lower than that of the second ND portion 63; the third ND portion 64 serves as a low optical density portion having a reflectance of substantially zero. The first ND portion 62, the second ND portion 63 and the third ND portion 64 are provided as coatings applied to a transparent disc made of a transparent material such as glass or plastic.

Figure 3C:
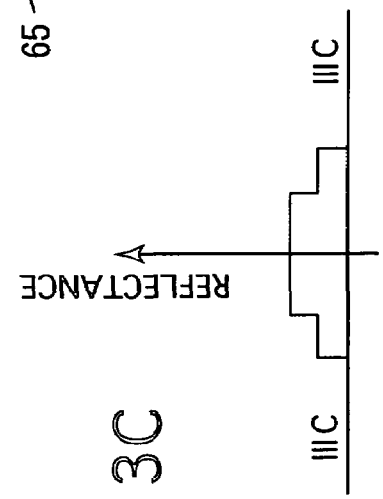
FIG. 3C is a graph showing the distribution of refractivity of the ND filter, taken along the IIIC—IIIC line shown in FIG. 3B.

Accordingly, the optical density of the ND filter 60 decreases stepwise in a direction radially outwards from the center 65. Namely, the reflectance of the ND filter 60 decreases in a direction radially outwards from the center 65 as shown in FIG. 3C. As another embodiment of the ND filter 60, the ND filter 60 can be modified so that the optical density decreases continuously or discontinuously in a direction radially outwards in each of the first through third ND portions 62 through 64. In addition, the ND filter 60 only needs to be formed to include two or more ND portions having different optical densities; for instance, the third ND portion 64 can be a non-ND portion to which no coating is applied.

A broken line shown in FIG. 3A indicates an outermost light path of the light rays of an object which pass through the outermost regions of the fourth and fifth lens groups 4 and 5. Therefore, the effective aperture of the ND filter 60 is set to the diameter ($d_0$) of the third ND portion 64 which is slightly smaller than the inside diameter (D) of the annular filter frame 61. The diameter of the high-optical density portion of the ND filter 60, i.e., the diameter ($d_{ND2}$) of the second ND portion 63, is set to be smaller than the effective aperture of the photographing optical system which is shown by a broken line shown in FIG. 3A.

Due to the above described structure of the ND filter 60, the light rays which are passed through the outer regions of the first through fifth lens groups 1 through 5 of the photographing optical system 55 pass through the third ND portion 64 (which has a low reflectance) while the light rays which are passed through a central portion of the first through fifth lens groups 1 through 5 of the photographing optical system 55 pass through either the first ND portion 62 or the second ND portion 63 (each of which is high in optical density (reflectance)). Therefore, with the ND filter 60, the light quantity of the light rays which are passed through a central portion of the photographing optical system 55 to be incident on a film surface (not shown) is reduced with a minimum reduction of the light quantity of the light rays which are passed through a marginal portion of the photographing optical system 55. Consequently, the difference between marginal rays and central rays becomes smaller by the ND filter 60.

Figure 5B:
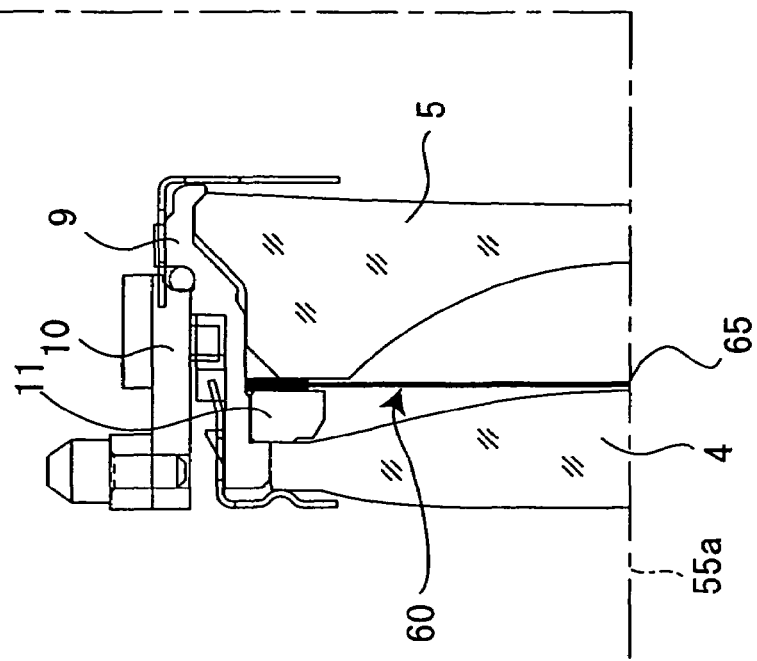
FIG. 5B is a view similar to that of FIG. 3A and illustrates another embodiment of the placement of the ND filter, wherein the ND filter is positioned between a fifth lens group and a spacer ring.
Figure 5A:
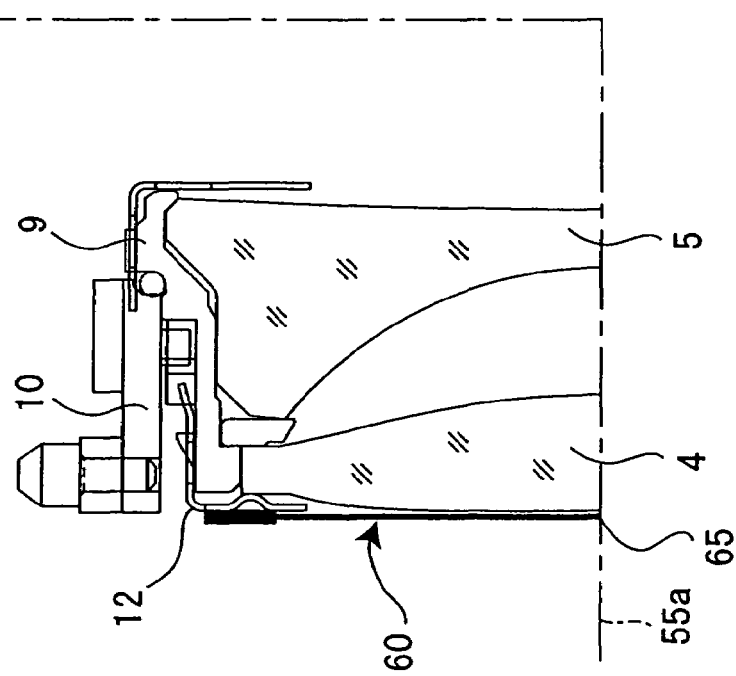
FIG. 5A is a view similar to that of FIG. 3A and illustrates another embodiment of the placement of the ND filter, wherein the ND filter is fixed to the front end of a fourth lens group pressing ring.

FIGS. 5A and 6 show another embodiment of the placement of the ND filter 60, and FIGS. 5B and 7 show yet another embodiment of the placement of the ND filter 60.

Although the ND filter 60 is fixed to a rear end surface of the light shield frame 13 in the above illustrated embodiment of the lens barrel, the ND filter 60 can be fixed to a front end surface of the fourth lens group pressing ring 12 as shown in FIGS. 5A and 6, or provided between the spacer ring 11 and the fifth lens group 5 to be fixed therebetween as shown in FIGS. 5B and 7, as long as the center 65 of the ND filter 60 is positioned on the optical axis 55a. With this arrangement, the difference between marginal rays and central rays becomes smaller.

The ND filter 60 can also be applied to any lens barrel other than the above described lens barrel 50 which has an optical system having five lens groups. Furthermore, the ND filter 60 can be applied to a telescoping type zoom lens provided with three or less than three external telescoping barrels, or five or more than five external telescoping barrels. Alternatively, the ND filter 60 can be applied to a fixed-focal-length lens having a short focal length for a wide angle of view.

Although a single ND filter is used in the above illustrated embodiment of the lens barrel, two or more ND filters can be placed on the optical axis 55a.

Figure 8A:
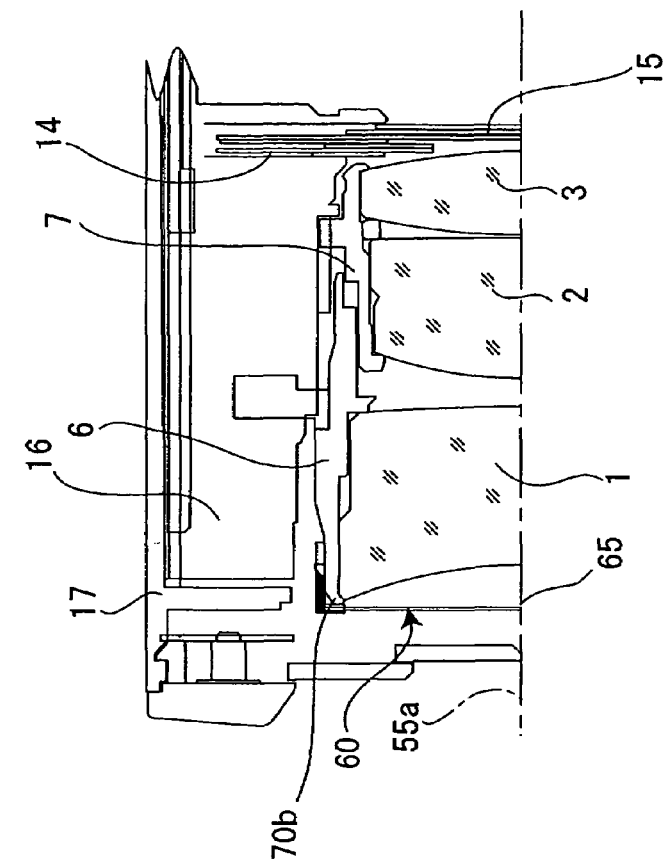
FIG. 8A is a longitudinal cross sectional view of another embodiment of the placement of the ND filter, wherein the ND filter is positioned between a first lens group and a second lens group.
Figure 9:
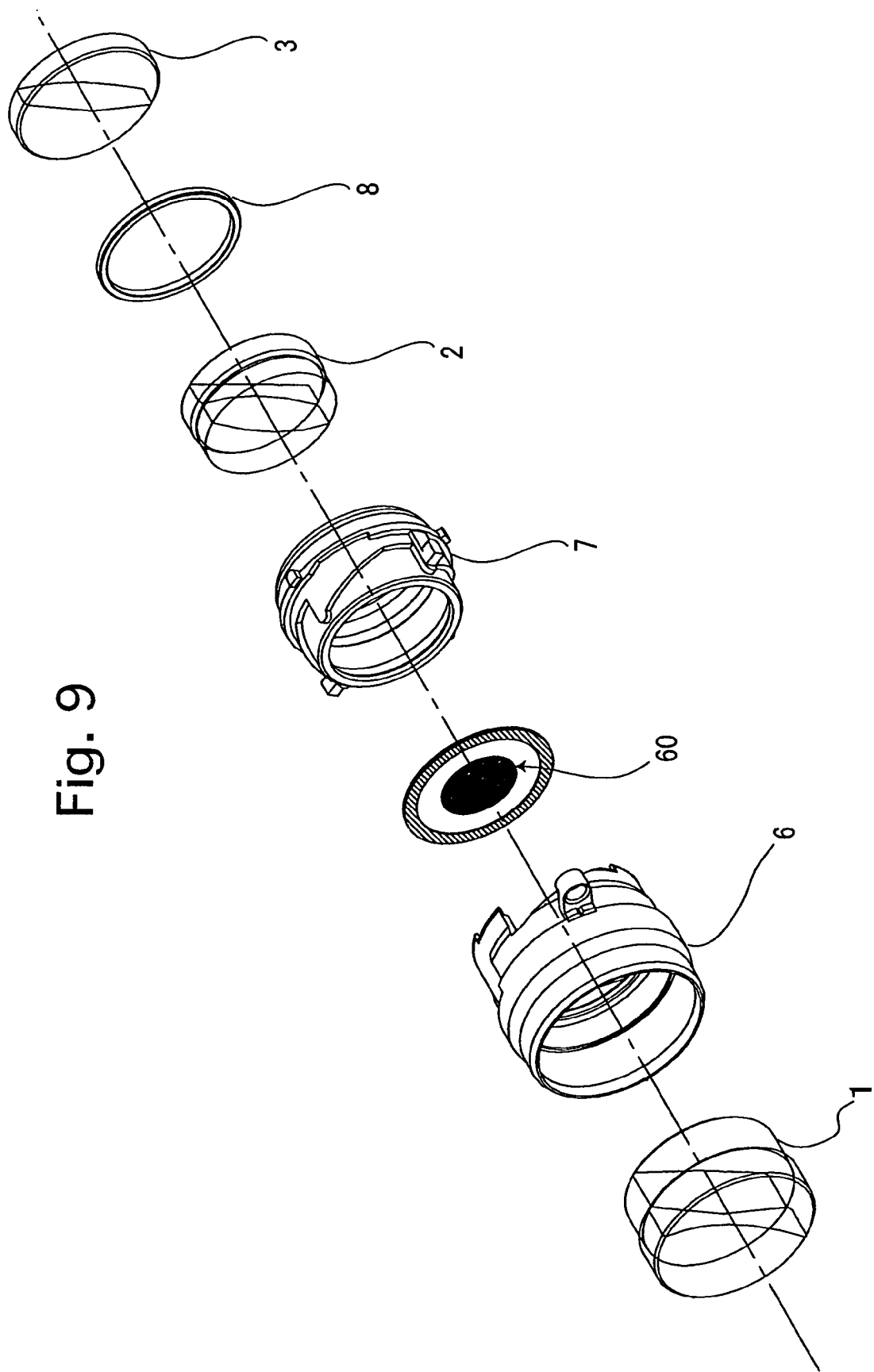
FIG. 9 is an exploded perspective view of the portion of the lens barrel shown in FIG. 8A.

FIGS. 8A and 9 show another embodiment of the placement of the ND filter 60.

The front lens frame 6 is provided, on an inner peripheral surface thereof at its approximate center in the optical axis direction, with an protrusion 70 which projects radially inwards to contact with a marginal portion of the rear surface of the first lens group 1 to determine the position of the first lens group 1 in the optical axis direction relative to the front lens frame 6. As shown in FIG. 8A, the ND filter 60 is fixed to a rear end surface 70a of the protrusion 70 so that the center 65 is positioned on the optical axis 55a. With this arrangement, the difference between marginal rays and central rays becomes smaller.

Figure 8B:
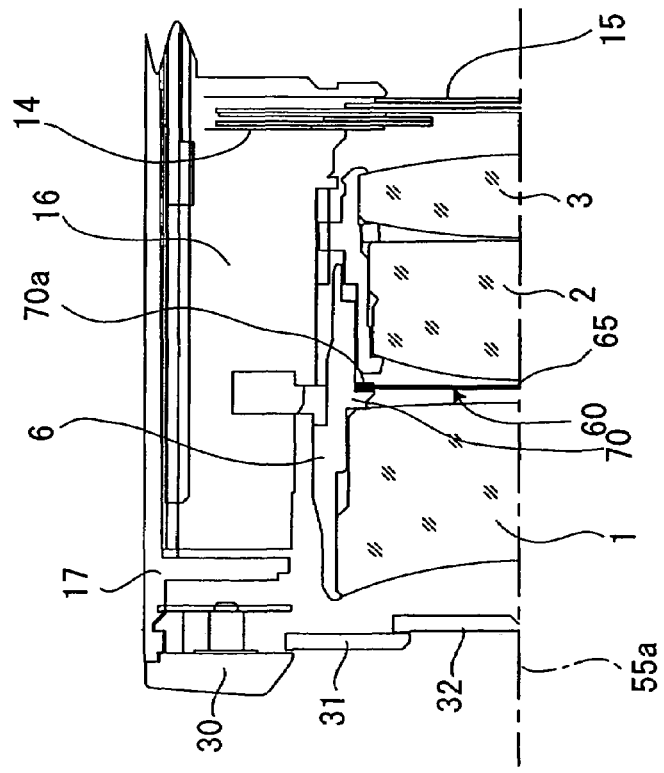
FIG. 8B is a view similar to that of FIG. 8A and illustrates another embodiment of the placement of the ND filter, wherein the ND filter is fixed to the front end of a front lens frame.
Figure 10:
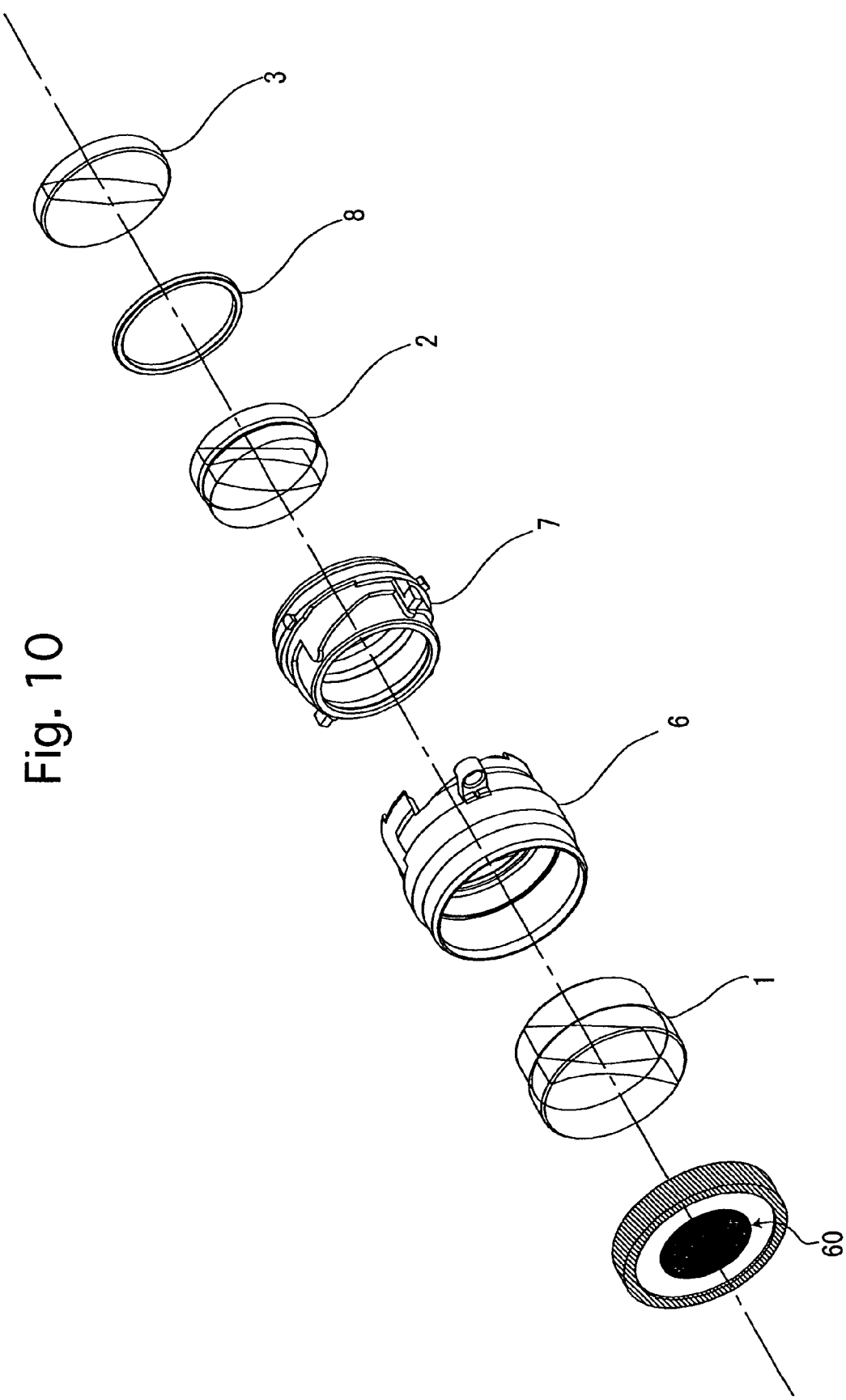
FIG. 10 is an exploded perspective view of the portion of the lens barrel shown in FIG. 8B.

FIGS. 8B and 10 show another embodiment of the placement of the ND filter 60. As shown in FIG. 8B and 10, the ND filter 60 can be fixed to a front end 70b of the front lens frame 6. With this arrangement, the difference between marginal rays and central rays becomes smaller.

Figure 11:
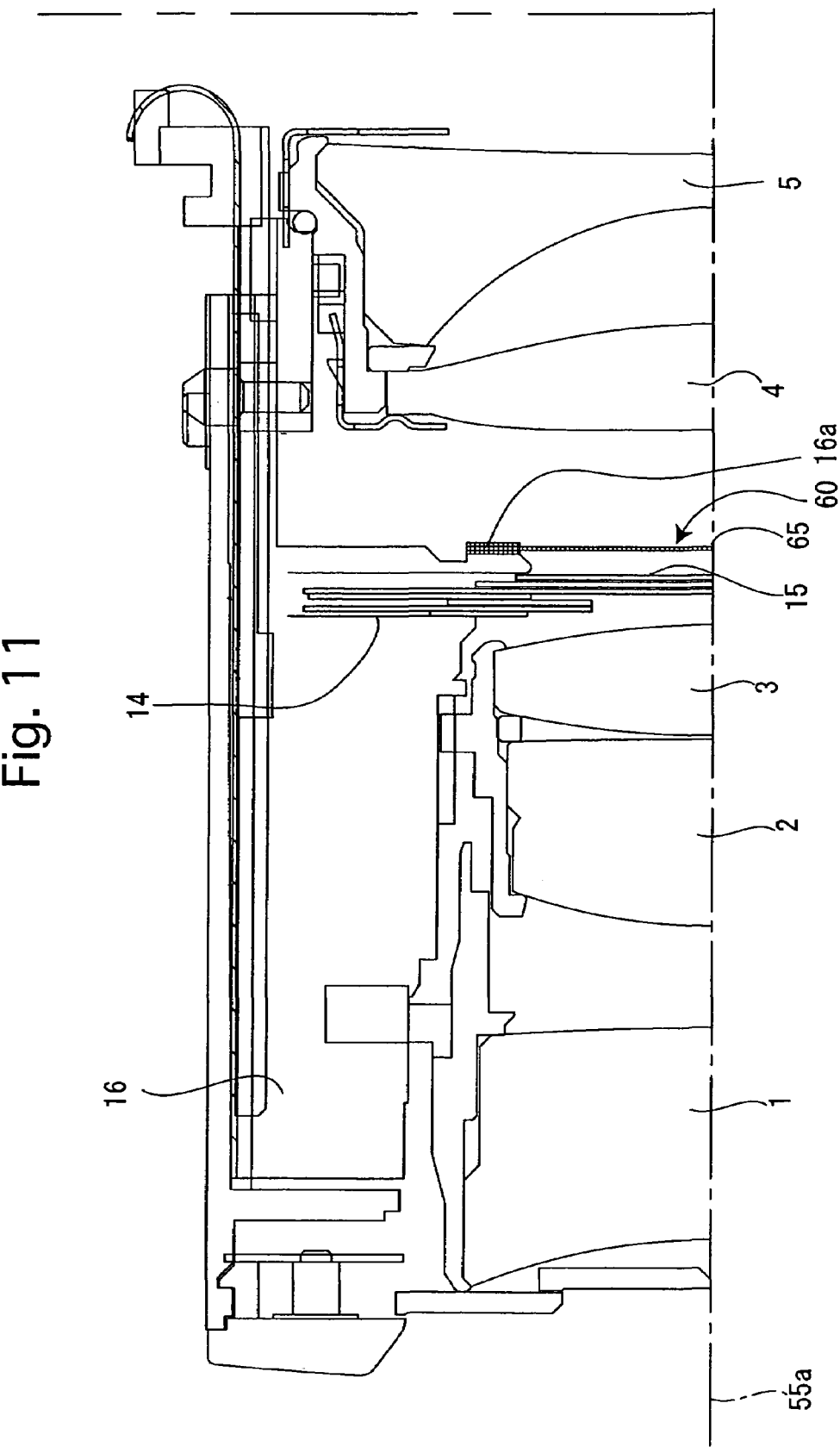
FIG. 11 is a longitudinal cross sectional view of another embodiment of the placement of the ND filter, wherein the ND filter is fixed to a rear end surface of a shutter unit.
Figure 12:
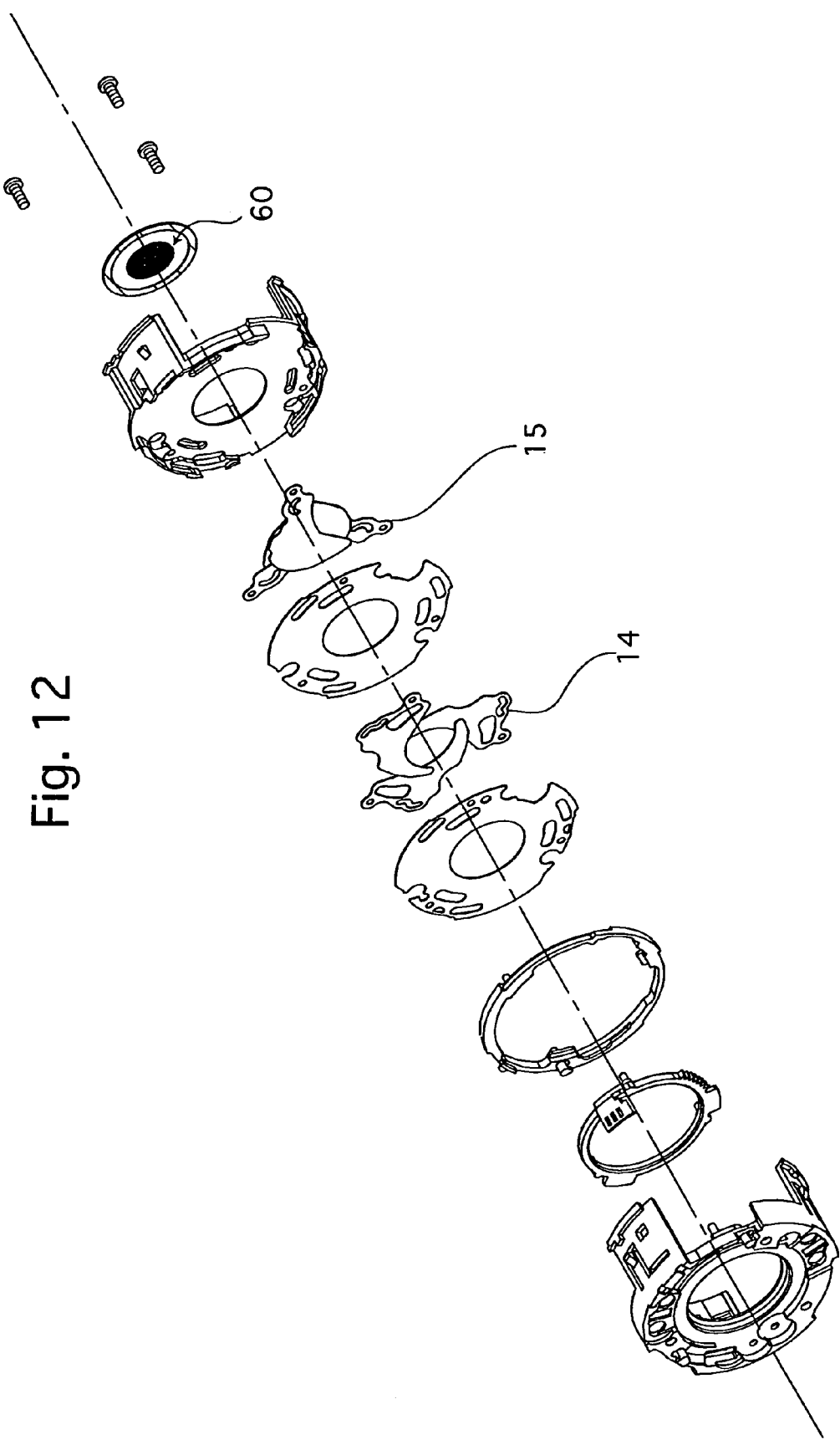
FIG. 12 is an exploded perspective view of the portion of the lens barrel shown in FIG. 11.

FIGS. 11 and 12 show another embodiment of the placement of the ND filter 60.

As shown in FIGS. 11 and 12, the ND filter 60 is fixed to a rear end surface of the shutter unit 16 so that the center 65 is positioned on the optical axis 55a. With this arrangement, the difference between marginal rays and central rays becomes smaller.

[Second Embodiment]

Figure 13:
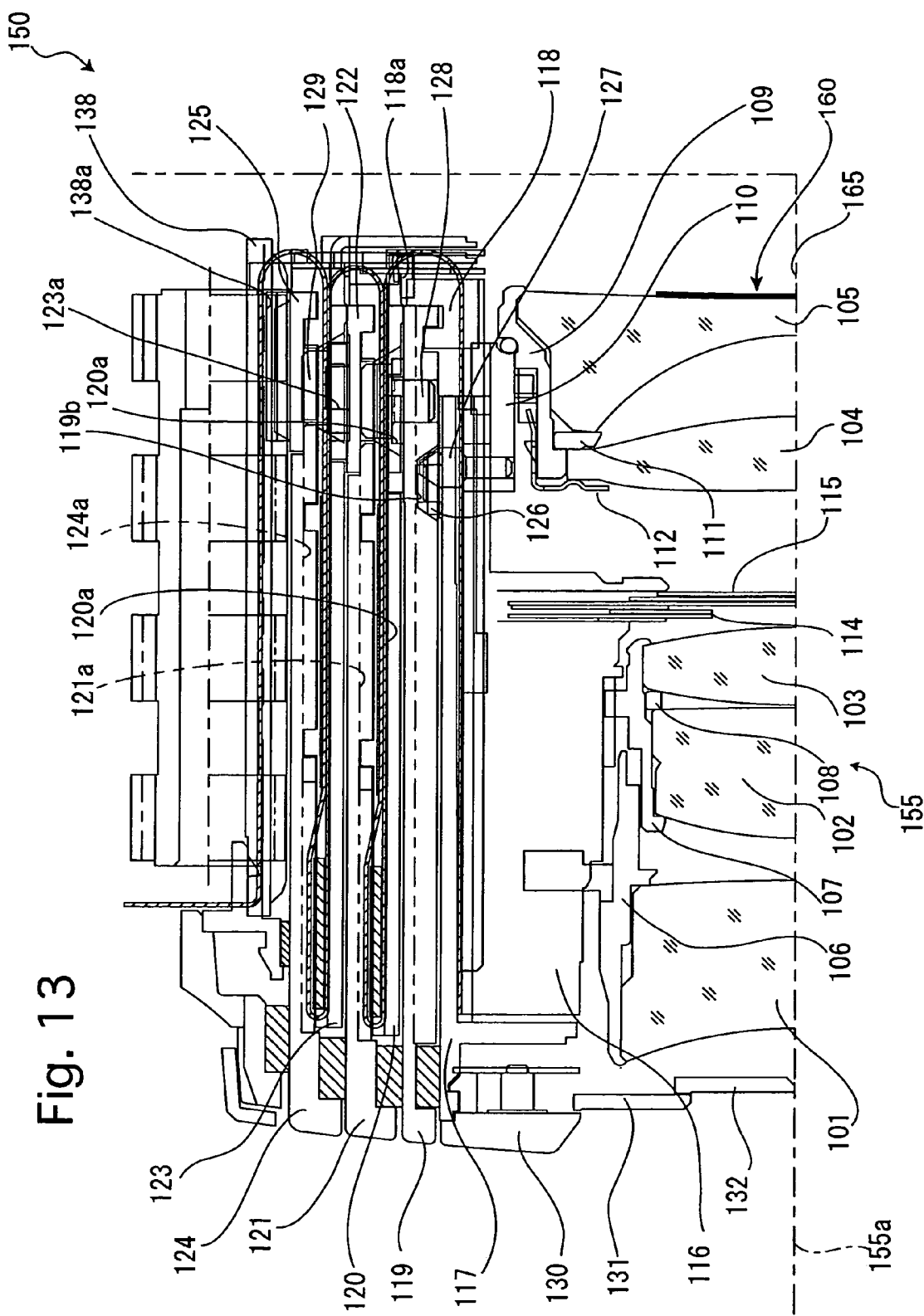
FIG. 13 is a longitudinal cross sectional view of a second embodiment of the lens barrel according to the present invention, showing only an upper half from an optical axis.
Figure 14A:
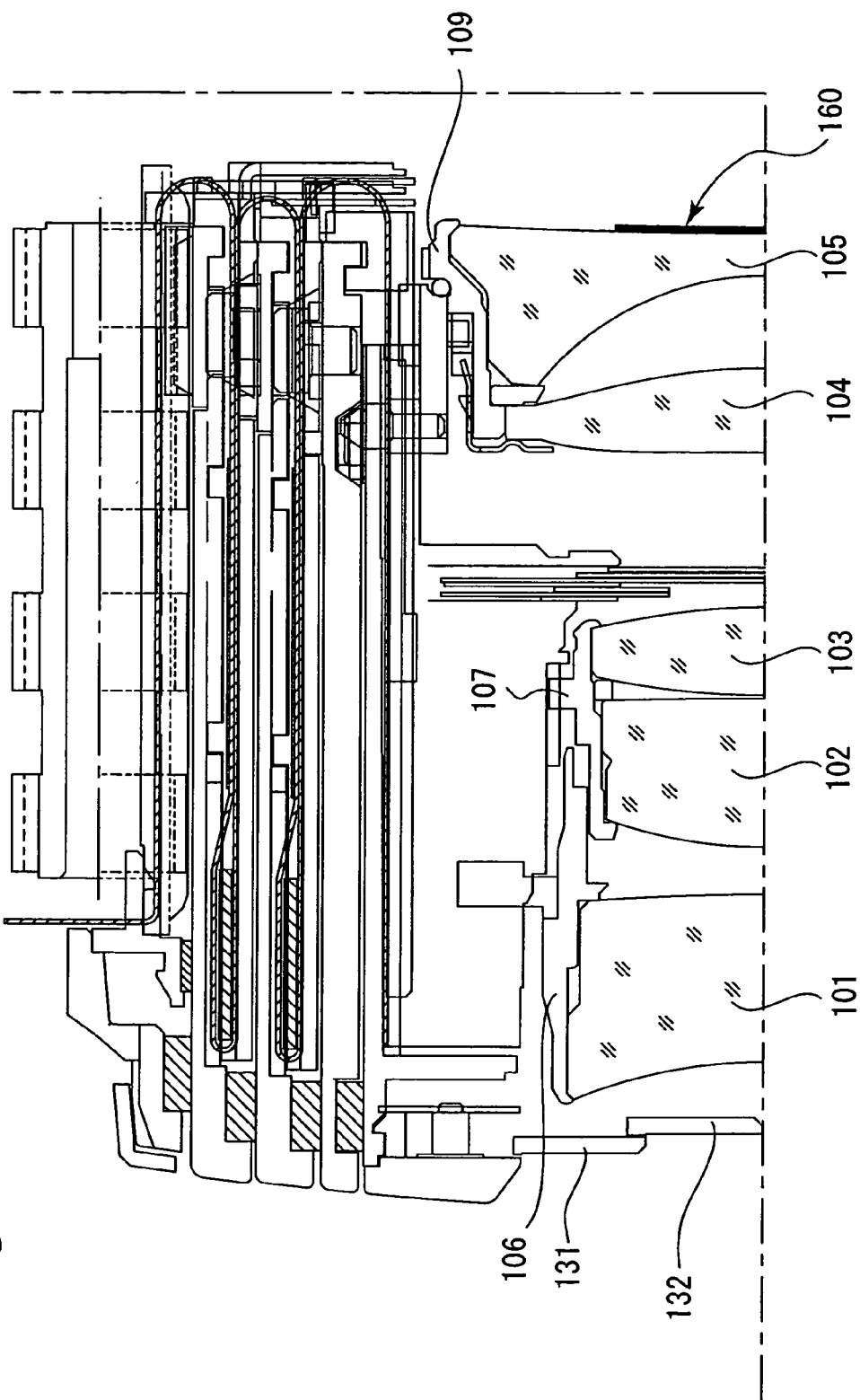
FIG. 14A is a longitudinal cross sectional view of the lens barrel shown in FIG. 13, showing the lens barrel in a retracted state.
Figure 14B:
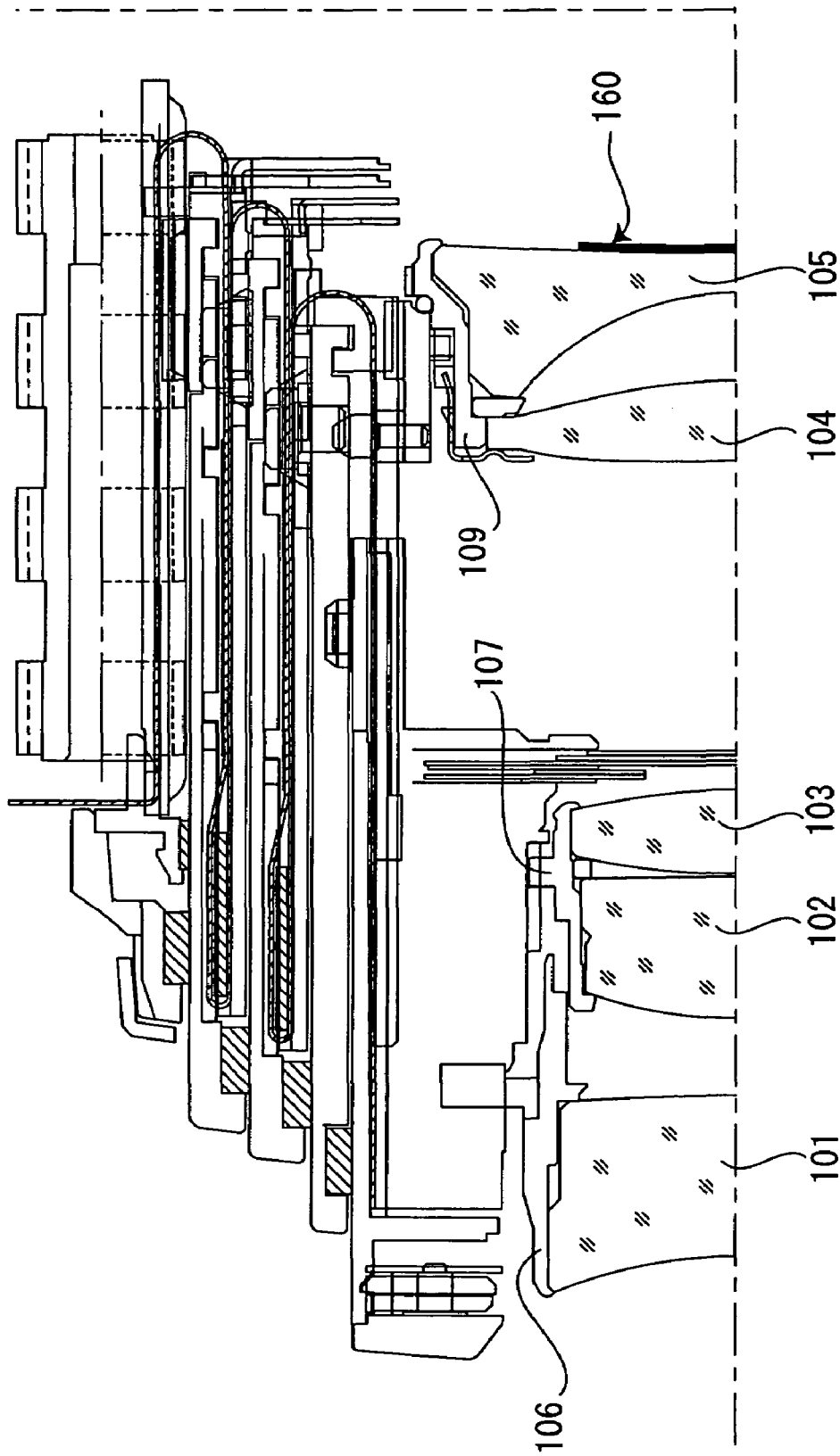
FIG. 14B is a longitudinal cross sectional view of the lens barrel shown in FIG. 13, showing the lens barrel at the wide-angle extremity.
Figure 14C:
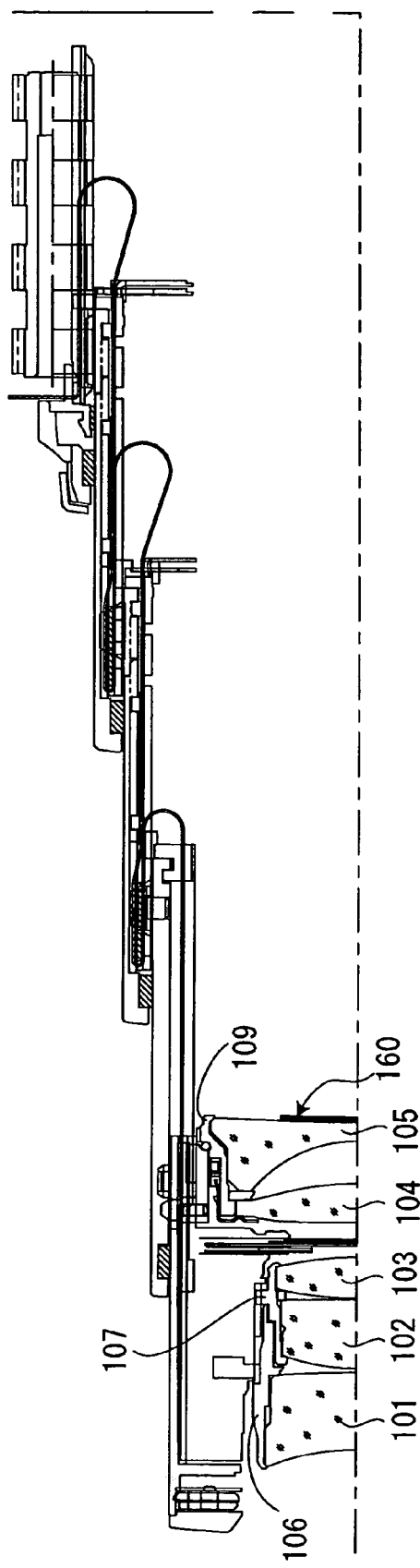
FIG. 14C is a longitudinal cross sectional view of the lens barrel shown in FIG. 13, showing the lens barrel at the telephoto extremity.

FIGS. 13 through 14C show a second embodiment of the lens barrel according to the present invention. Similar to the first embodiment of the lens barrel shown in FIG. 13, the lens barrel 150 is a telescoping type zoom lens of a camera which is provided with four external telescoping barrels: a first external barrel (lens support barrel) 117, a second external barrel (cam ring) 119, a third external barrel 121 and a fourth external barrel 124, which are concentrically arranged about an optical axis 155a of a photographing optical system 155 of the lens barrel 150. The photographing optical system 155 of the lens barrel 150 includes a first lens group (lens element) 101, a second lens group (lens element) 102, a third lens group (lens element) 103, a diaphragm (diaphragm blades) 114, a shutter (shutter blades) 115, a fourth lens group (lens element) 104, a fifth lens group (lens element) 105, in that order from the object side (the left side as viewed in FIG. 13). The lens barrel 150 is provided around the fourth external barrel 124 with a housing 138 which supports the first through fourth external barrels 117, 119, 121 and 124 so that each of the first through fourth external barrels 117, 119, 121 and 124 can move forward and rearward with respect to one other along the optical axis 155a.

The fourth external barrel 124 is coupled to the housing 138 by engagement of a male helicoid with a female helicoid which are formed on the fourth external barrel 124 and the housing 138, respectively. Likewise, the third external barrel 121 is coupled to the fourth external barrel 124 by engagement of a male helicoid with a female helicoid which are formed on the third external barrel 121 and the fourth external barrel 124, respectively. Likewise, the second cam ring 119 is coupled to the third external barrel 121 by engagement of a male helicoid with a female helicoid which are formed on the cam ring 119 and the third external barrel 121, respectively. The first external barrel (lens support barrel) 117 is coupled to the cam ring 119 by a cam mechanism provided therebetween.

The fourth external barrel 124 is fitted into the housing 138, and a second helicoid ring 125 is fixed to a rear end surface of the fourth external barrel 124. The second helicoid ring 125 is engaged with an axial groove 138a parallel to the optical axis 155a formed on an inner peripheral surface of the housing 138. Due to this engagement of the second helicoid ring 125 with the axial groove 138a, the fourth external barrel 124, together with the second helicoid ring 125, can move along the optical axis 155a with respect to the housing 138.

The lens barrel 150 is provided inside the fourth external barrel 124 with a third linear guide ring 123 which is fitted into the fourth external barrel 124. The third linear guide ring 123 is provided on an inner peripheral surface thereof with a plurality of inclined lead slots 123a which are inclined with respect to the optical axis direction (i.e., the direction parallel to the optical axis 155a). The third external barrel 121 is fitted into the third linear guide ring 123, and a first helicoid ring 122 is fixed to a rear end of the third external barrel 121. The fourth external barrel 124 is provided on an inner peripheral surface thereof with a plurality of linear guide grooves 124a (only one of them appears in FIG. 13) which extend parallel to the optical axis 155a. A plurality of guide followers 129 (only one of them appears in FIG. 13) which are fixed to an outer peripheral surface of the first helicoid ring 122 pass through the plurality of inclined lead slots 123a to be engaged in the plurality of linear guide grooves 124a, respectively. With this engagement of the guide followers 129 with both the inclined lead slots 123a and the linear guide grooves 124a, the third external barrel 121 and the first helicoid ring 122 are linearly guided by the third linear guide ring 123 in the optical axis direction.

The lens barrel 150 is provided radially inside the third external barrel 121 with a second linear guide ring 120 which is fitted into the third external barrel 121. The second linear guide ring 120 is provided with two inclined lead slots 120a which pass through the second linear guide ring 120 and are inclined with respect to the optical axis direction (i.e., the direction parallel to the optical axis 155a). The third external barrel 121 is provided on an inner peripheral surface thereof with two rotation transmitting grooves 121a (only one of them appears in FIG. 13) which extend parallel to the optical axis 155a. Two guide followers 128 (only one of them appears in FIG. 13) which are fixed to an outer peripheral surface of the cam ring 119 at equi-angular intervals (i.e., at intervals of 180 degrees) in a circumferential direction of the cam ring 119 pass through the two inclined lead slots 120a to be engaged in the two rotation transmitting grooves 121a, respectively. Due to the engagement of the guide followers 128 with both the inclined lead slots 120a and the rotation transmitting grooves 121a, the cam ring 119 is linearly guided by the second linear guide ring 120 in the optical axis direction.

The lens barrel 150 is provided inside the cam ring 119 with a first linear guide ring 118. The first linear guide ring 118 is supported by the cam ring 119 to move together with the cam ring 119 while allowing the cam ring 119 to rotate with respect to the first linear guide ring 118. The first linear guide ring 118 is provided at a rear end thereof with a plurality of linear guide projections 118a which project radially outwards to be engaged in a plurality of linear guide grooves 120b formed on an inner peripheral surface of the second linear guide ring 120. This engagement of the linear guide projections 118a with the linear guide grooves 120b allows the first linear guide ring 118 to move linearly in the optical axis direction without rotating with respect to the second linear guide ring 120.

The lens barrel 150 is provided inside the cam ring 119 with a lens support ring 117, and is provided inside the lens support ring 117 with a rear lens frame 109. The lens support ring 117 and the rear lens frame 109 are linearly guided in the optical axis direction by the first linear guide ring 118. A rotation of the cam ring 119 relative to the lens support ring 117 causes the lens support ring 117 to move forward from the cam ring 119 in accordance with contours of a set of three cam grooves 119b formed on an inner peripheral surface of the cam ring 119. The set of three cam grooves 119b are formed on an inner peripheral surface of the cam ring 119 in the vicinity of the rear end thereof at equi-angular intervals in a circumferential direction of the cam ring 119. A set of three cam followers pins 127 radially extend through the lens support ring 117 at equi-angular intervals in a circumferential direction of the lens support ring 117, and are fixed to the lens support ring 117 so that radially outer ends of the set of three cam followers pins 127 are engaged in the set of three cam grooves 119b. A set of three cam follower rollers 126 are fixed to an outer peripheral surface of the lens support ring 117 to project radially outwards to be engaged in the set of three cam grooves 119b so that a rotation of the cam ring 119 with respect to the lens support ring 117 causes the lens support ring 117 to move along the optical axis 155*a* in a predetermined moving manner due to the engagement of the three cam follower rollers 126 with the three cam grooves 119*b*.

The lens barrel 150 is provided inside the lens support ring 117 with a shutter unit (AF/AE shutter unit) 116 having the diaphragm 114 and the shutter 115. The lens barrel 150 is provided inside the shutter unit 116 with a front lens frame 106 and a middle lens frame 107 which are supported by the shutter unit 116 to be movable along the optical axis 155*a* relative to the shutter unit 116. The first lens group 101 is supported by the front lens frame 106 to be fixed thereto. The second lens group 102 and the third lens group 103 are supported by the middle lens frame 107 to be fixed thereto with a spacer ring 108 being provided between the second lens group 102 and the third lens group 103. The front lens frame 106 and the middle lens frame 107 are supported by the shutter unit 116 to be movable relative to each other along the optical axis 155*a*.

The set of three cam follower pins 127, which radially extend through the lens support ring 117, are fixed at their radially inner ends to an outer peripheral surface of a rear lens frame moving ring 110 which is positioned inside the lens support ring 117 in the vicinity of the rear end thereof. The rear lens frame 109 is screwed into a rear end portion of the rear lens frame moving ring 110. The fourth lens group 104 and the fifth lens group 105 are supported by the rear lens frame 109 to be fixed thereto. Movement of the set of three cam follower pins 127 in the set of three of three cam grooves 119*b* therealong causes the rear lens frame 109 to move along the optical axis 155*a*. The fourth lens group 104 is fixed to the rear lens frame 109 by a fourth lens group pressing ring 112 which is fitted on a front end of the rear lens frame 109. The fourth lens group 104 and the fifth lens group 105 are supported by the rear lens frame 109 to be fixed thereto with a spacer ring 111 being interposed between the fourth lens group 104 and the fifth lens group 105.

As shown in FIGS. 14A, 14B and 14C, by moving the front lens frame 106, the middle lens frame 107 and the rear lens frame 109 along the optical axis 155*a* relative to one another, the lens barrel 150 changes between an accommodated position (shown in FIG. 14A) and the wide-angle extremity (shown in FIG. 14B), and can change the focal length between the wide-angle extremity (shown in FIG. 14B) and the telephoto extremity (shown in FIG. 14C). Although the focal length of the photographing optical system 155 at the wide-angle extremity is set to 20 mm (35 mm film camera conversion) in the present embodiment of the lens barrel, reduction in light quantity of marginal rays can be minimized if the focal length of the photographing optical system 155 at the wide-angle extremity is set to a focal length in a wide-angle range between 20 mm and 38 mm (35 mm film camera conversion). The shutter unit 116 drives the front lens frame 106 and the middle lens frame 107 forward and rearward along the optical axis 155*a* while changing the space therebetween to perform a focusing operation.

The lens barrel 150 is provided at the front end of the lens support frame 117 with a lens barrier mechanism which automatically closes a front end aperture of the lens barrel 150 when the lens barrel 150 is retracted into the camera body as shown in FIG. 14A, i.e., when the lens barrel 150 is not in use. The lens barrier mechanism is provided with a decorative plate 130 which is fixed to the front end of the lens support frame 117, and is further provided immediately behind the decorative plate 130 with a pair of barrier blades 131 and 132 each of which is pivoted on an associated pivot (not shown) formed on a rear surface of the decorative plate 130. When the power of the camera is turned ON and OFF, the pair of barrier blades 131 and 132 rotate together about the respective pivots to open and close a front end aperture of the lens barrel 150 which is formed on the decorative plate 130.

The lens barrel 150 is provided on a rear surface of the fifth lens group 105 with a circular ND (neutral density) coating 160 having a circular plan view so that a center 165 of the ND coating 160 is positioned on the optical axis 155*a*. The ND coating 160 and the ND filter 60 are functionally the same.

Figure 15B:
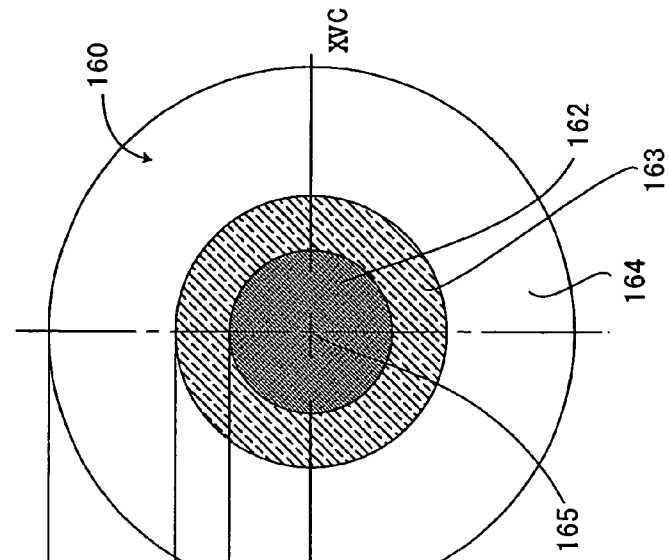
FIG. 15B is a plan view of the ND coating, showing the structure thereof.

As shown in FIG. 15B, the disc-shaped ND coating 160 has three concentric coating portions which are formed concentrically with respect to the center 165. These three concentric filter portions are a first ND portion 162 (diameter=$d_{ND1}$) serving as a central ND portion, a second ND portion 163 (diameter=$d_{ND2}$) positioned around the first ND portion 162, and a third ND portion 164 (diameter=$d_0$) positioned around the second ND portion 163. The optical density (reflectance) of the first ND portion 162 is higher than those of the other two ND portions 163 and 164. The optical density (reflectance) of the second ND portion 163 is slightly lower than that of the first ND portion 162, but is still high so that the first ND portion 162 and the second ND portion 163 constitute a high optical density portion of the ND coating 160. The optical density of the third ND portion 164 is much lower than that of the second ND portion 163; the third ND portion 164 serves as a low optical density portion having a reflectance of substantially zero.

Accordingly, the optical density of the ND coating 160 decreases stepwise in a direction radially outwards from the center 165. Namely, the reflectance of the ND coating 160 decreases in a direction radially outwards from the center 165 as shown in FIG. 15C. As another embodiment of the ND coating 160, the ND coating 160 can be modified so that the optical density decreases continuously or discontinuously in a direction radially outwards in each of the first through third ND portions 162 through 164. In addition, the ND coating 160 only needs to be formed to include two or more ND portions having different optical densities; for instance, the third ND portion 164 can be a non-ND portion to which no coating is applied.

Figure 15A:
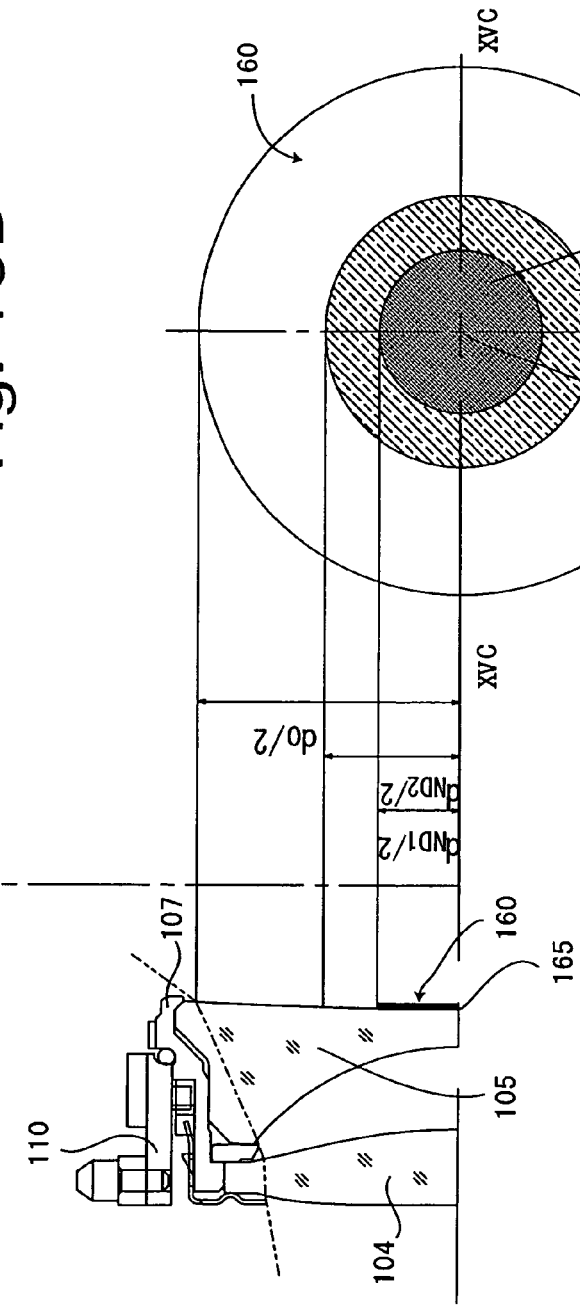
FIG. 15A is a longitudinal cross sectional view of a portion of the lens barrel shown in FIG. 13, showing the location of an ND coating in the lens barrel.
Figure 15C:
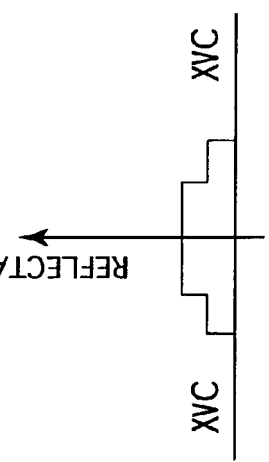
FIG. 15C is a graph showing the distribution of refractivity of the ND coating, taken along XVC—XVC line shown in FIG. 15B.

A broken line shown in FIG. 15A indicates an outermost light path of the light rays of an object which pass through the outermost regions of the fourth and fifth lens groups 104 and 105. Therefore, the effective aperture of the ND coating 160 is set to the diameter ($d_0$) of the third ND portion 164 which is slightly smaller than the inside diameter (D) of the annular filter frame 161. The diameter of the high-optical density portion of the ND coating 160, i.e., the diameter ($d_{ND2}$) of the second ND portion 163 is set to be smaller than the effective aperture of the photographing optical system which is shown by a broken line shown in FIG. 15A.

Due to the above described structure of the ND coating 160, the light rays which are passed through the outer regions of the first through fifth lens groups 101 through 105 of the photographing optical system 155 pass through the third ND portion 164 (which has a low reflectance), while the light rays which are passed through a central portion of the first through fifth lens groups 101 through 105 of the photographing optical system 155 pass through either the first ND portion 162 or the second ND portion 163 (each of which is high in optical density (reflectance)). Therefore, with the ND coating 160, the difference between marginal rays and central rays becomes smaller.

Figure 19:
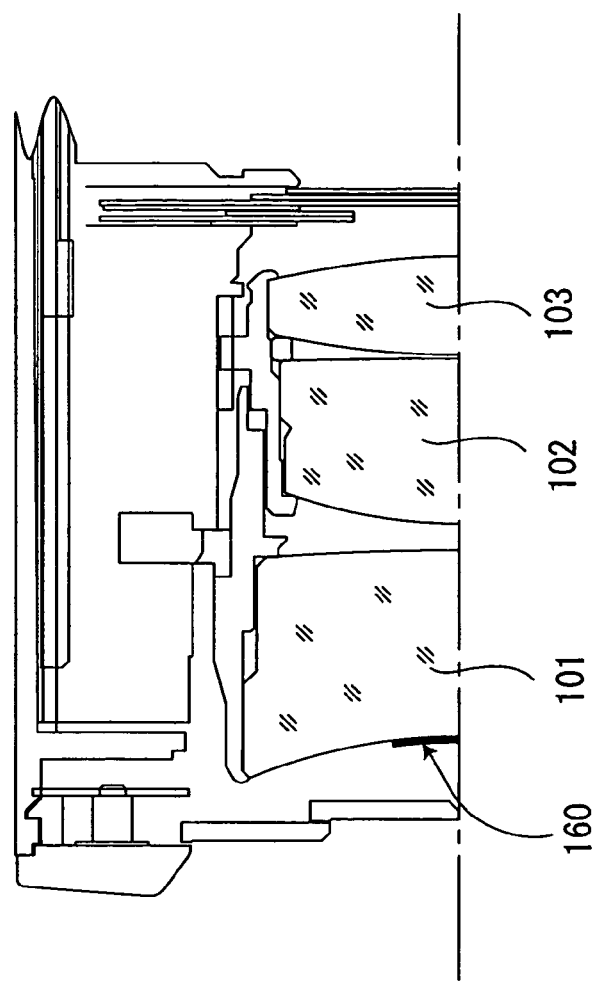
FIG. 19 is a longitudinal cross sectional view of a portion of another embodiment of the lens barrel shown in FIG. 13, wherein the ND coating is applied to the front surface of a first lens group, showing only an upper half of the portion of the lens barrel from an optical axis.
Figure 17:
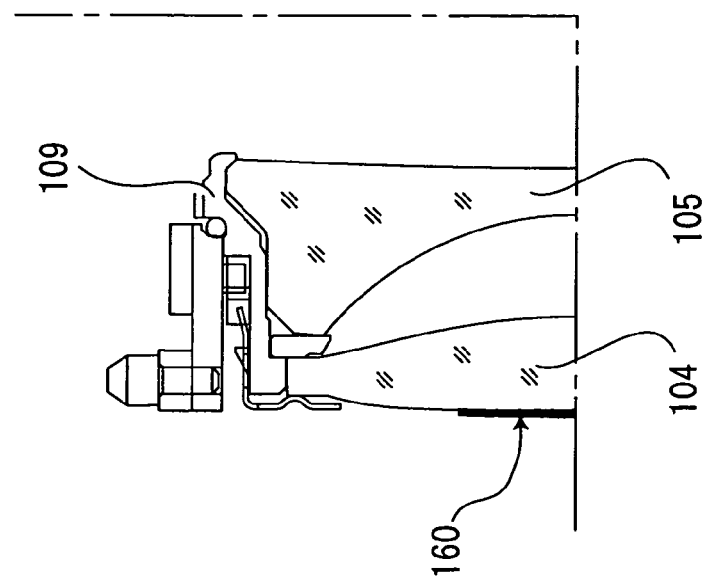
FIG. 17 is a view similar to that of FIG. 15A and illustrates another embodiment of the portion of the lens barrel shown in FIG. 15A, wherein the ND coating is applied to the front surface of a fourth lens group.
Figure 18:
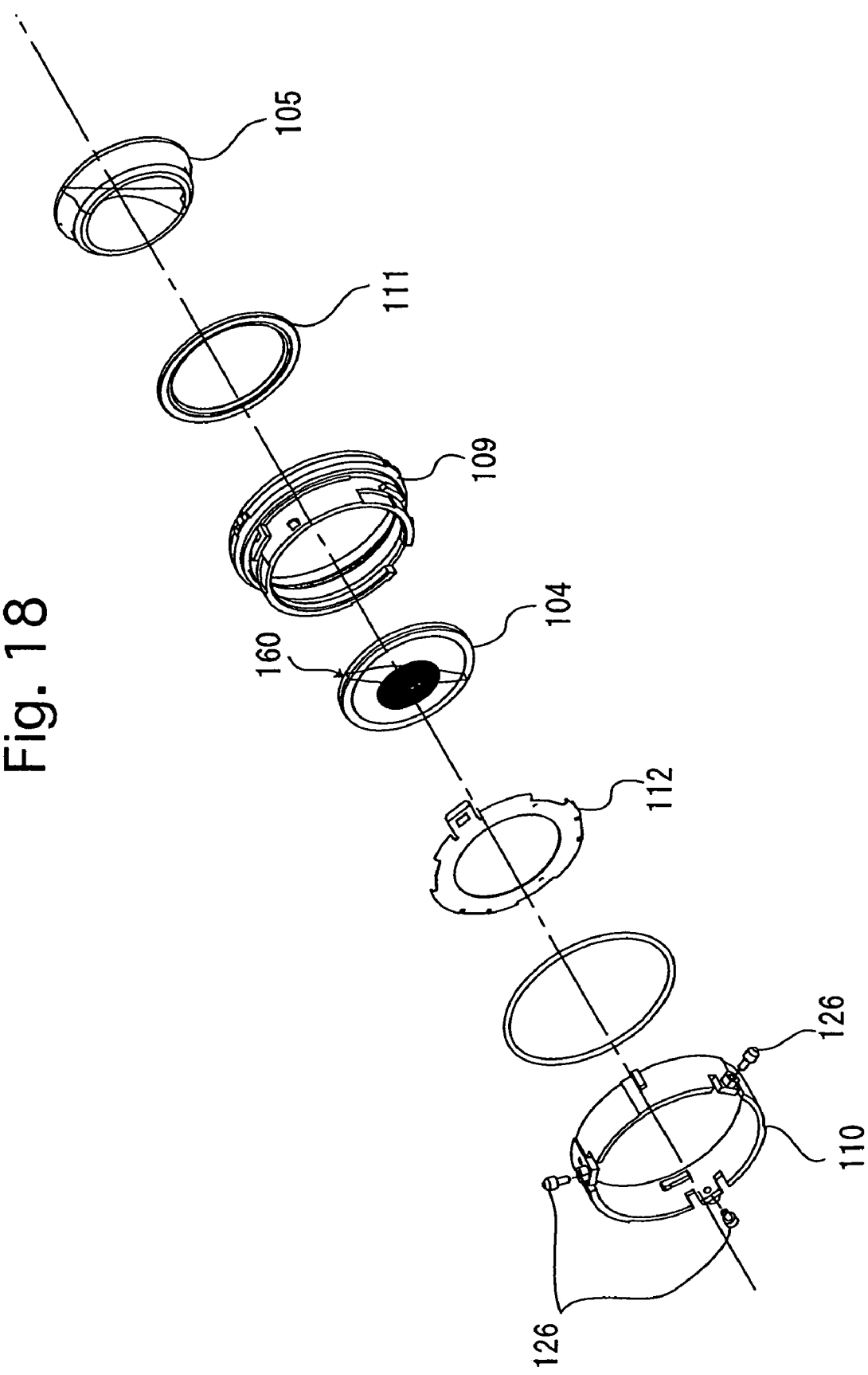
FIG. 18 is an exploded perspective view of the portion of the lens barrel shown in FIG. 17.
Figure 20:
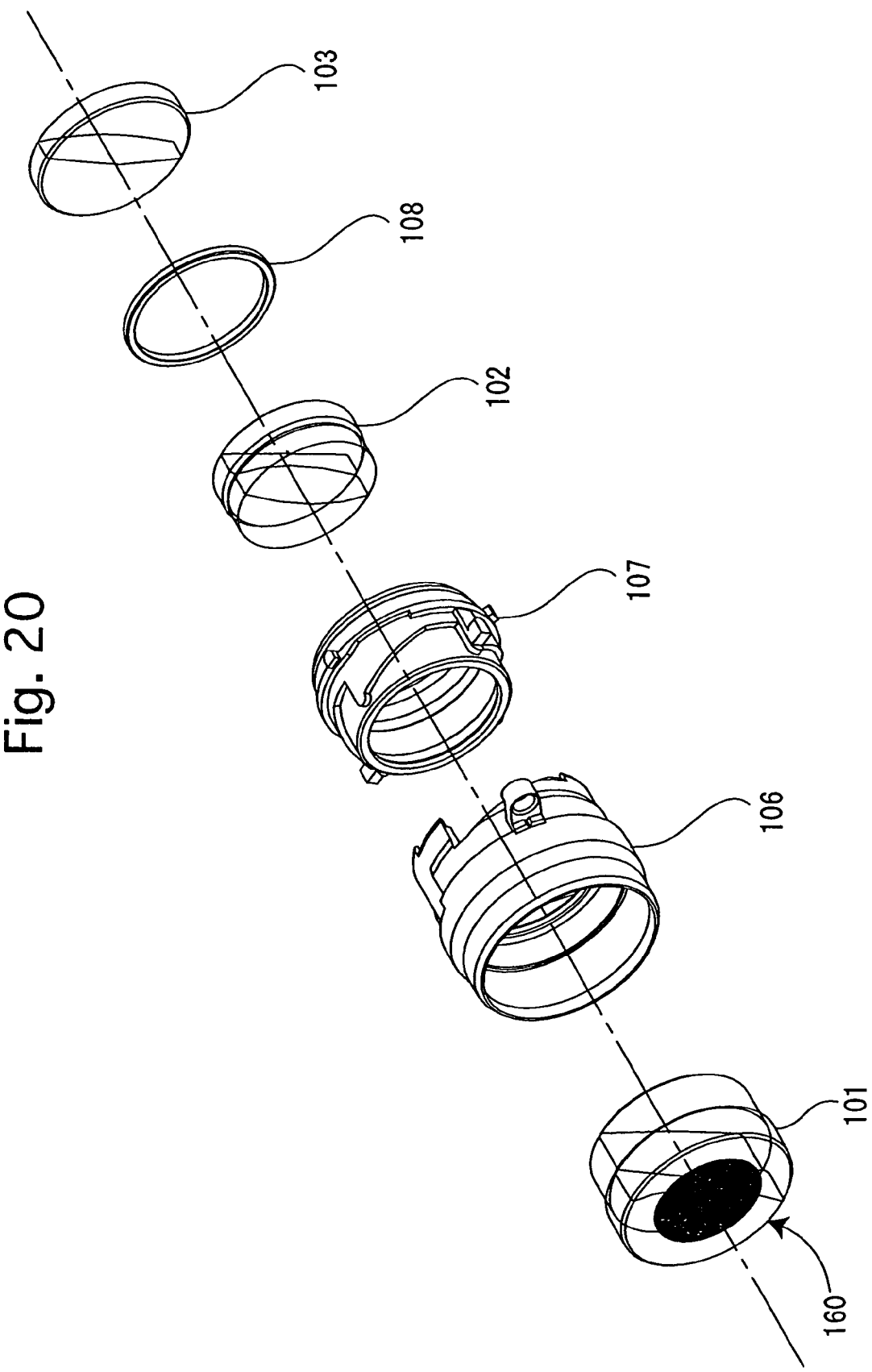
FIG. 20 is an exploded perspective view of the portion of the lens barrel shown in FIG. 19.

FIGS. 17 and 18 show another embodiment of the formation of the ND coating 160, and FIGS. 19 and 20 show yet another embodiment of the formation of the ND coating 160.

Although the ND coating 160 is formed on a rear surface of the fifth lens group 105 in the above illustrated embodiment of the lens barrel, the ND coating 160 can be formed on a front surface of the fourth lens group 104 as shown in FIGS. 17 and 18. With this arrangement, the difference between marginal rays and central rays becomes smaller.

As another embodiment, the ND coating 160 can be formed on a front surface of the first lens group 101 as shown in FIGS. 19 and 20. With this arrangement, the difference between marginal rays and central rays becomes smaller.

Even if the ND coating 160 is formed on a lens surface other than the rear surface of the fifth lens group 105, the front surface of the fourth lens group 104 and the front surface of the first lens group 101, effects similar to those obtained in any one of the above described embodiments can be expected.

The ND coating 160 can also be applied to a lens barrel other than the above described lens barrel 150 which has an optical system having five lens groups. Furthermore, the ND coating 160 can be applied to a telescoping type zoom lens provided with three or less than three external telescoping barrels, or five or more than five external telescoping barrels. Alternatively, the ND coating 160 can be applied to a fixed-focal-length lens having a short focal length for a wide angle of view.

Although a single ND coating is used in the above illustrated embodiment of the lens barrel 150, two or more separate ND coatings can be formed on different lens surfaces.

Obvious changes may be made in the specific embodiments of the present invention described herein, such modifications being within the spirit and scope of the invention claimed. It is indicated that all matter contained herein is illustrative and does not limit the scope of the present invention.

As can be understood from the foregoing, according to each of the above described embodiments of the lens barrels, a lens barrel having a simple structure minimizing reduction in light quantity of marginal rays is achieved.

What is claimed is:

1. A lens barrel, comprising:
   an optical system including a short focal length for a wide angle of view; and
   an ND filter in the shape of a disc which is provided on an optical axis of said optical system; wherein an optical density of said ND filter decreases in a direction radially outwards from a center of said ND filter, and
   a shutter unit, wherein said ND filter is fixed to said shutter unit.

2. The lens barrel according to claim 1, wherein said ND filter comprises:
   a high optical density portion in the shape of a circle which is provided at a center of said ND filter; and
   a low optical density portion provided around said high optical density portion,
   wherein a diameter of said high optical density portion is smaller than an effective aperture of said optical system.

3. The lens barrel according to claim 2, wherein said high optical density portion comprises at least two portions having different optical densities which are arranged concentrically with respect to said center of said ND filter.

4. The lens barrel according to claim 1, wherein said optical system comprises a plurality of lens groups which are fixed to a corresponding plurality of lens frames.

5. The lens barrel according to claim 1, wherein said ND filter comprises:
   a transparent optical element; and
   a coating which is applied to a surface of said transparent optical element,
   wherein a diameter of said coating is smaller than an effective aperture of said optical system.

6. The lens barrel according to claim 5, wherein said transparent optical element is in the shape of a disc.

7. The lens barrel according to claim 1, wherein said ND filter comprises at least two portions having different optical densities.

8. The lens barrel according to claim 1, wherein said lens barrel comprises a zoom lens.

9. The lens barrel according to claim 1, wherein said lens barrel comprises a telescoping type zoom lens.

10. A lens barrel, comprising:
    an optical system including a short focal length for a wide angle of view; and
    an ND coating applied to at least one lens element of said optical system;
    wherein an optical density of said ND coating decreases in a direction radially outwards from an optical axis of said lens element.

11. The lens barrel according to claim 10, wherein said ND coating comprises:
    a high optical density portion in the shape of a circle which is positioned at a center of said ND coating; and
    a low optical density portion positioned around said high optical density portion,
    wherein a diameter of said high optical density portion is smaller than an effective aperture of said optical system.

12. The lens barrel according to claim 10, wherein said optical system comprises a plurality of lens groups, and
    wherein said ND coating is applied to a frontmost lens group of said plurality of lens groups.

13. The lens barrel according to claim 12, wherein said high optical density portion comprises at least two portions having different optical densities which are arranged concentrically with respect to said center of said ND coating.

14. The lens barrel according to claim 10, wherein said optical system comprises a plurality of lens groups, and
    wherein said ND coating is applied to a rearmost lens group of said plurality of lens groups.

15. The lens barrel according to claim 10, wherein said ND coating is in the shape of a circle having a diameter smaller than the an effective aperture of said optical system.

16. The lens barrel according to claim 10, wherein said ND coating comprises at least two portions having different optical densities.

17. The lens barrel according to claim 10, wherein said optical system comprises a plurality of lens groups, said ND coating being applied to one of said plurality of lens groups.

18. The lens barrel according to claim 10, wherein said lens barrel comprises a zoom lens.

19. The lens barrel according to claim 10, wherein said lens barrel is a telescoping type zoom lens.

20. A photographing lens comprising:
    a plurality of lens elements; and
    at least one ND filter positioned on an optical axis of said plurality of lens elements,
    wherein an optical density of said ND filter decreases in a direction radially outwards from said optical axis, and
    wherein said ND filter is provided as a coating applied to at least one of said plurality of lens elements.

* * * * *